United States Patent [19]

Fukami et al.

[11] Patent Number: 5,170,298
[45] Date of Patent: Dec. 8, 1992

[54] RECORD AND REPRODUCE SIGNAL PROCESSING CIRCUIT THAT IS PROGRAMMABLE ACCORDING TO THE HEAD DRUM CONFIGURATION OF THE DIGITAL AUDIO TAPE RECORDER IN WHICH IT IS USED

[75] Inventors: Tadashi Fukami, Kanagawa; Makoto Yamada, Tokyo; Tsutomu Kajiwara, Kanagawa, all of Japan

[73] Assignee: Sony Corporation, Tokyo, Japan

[21] Appl. No.: 601,312

[22] Filed: Oct. 22, 1990

[30] Foreign Application Priority Data

Nov. 25, 1989 [JP] Japan .................................. 1-305884

[51] Int. Cl.⁵ .................... G11B 15/12; G11B 5/00; G11B 15/18
[52] U.S. Cl. ...................................... 360/61; 360/32; 360/69
[58] Field of Search .............. 360/27, 32, 46, 51, 360/64, 33.1, 61, 69; 369/47, 60, 49; 358/335

[56] References Cited

U.S. PATENT DOCUMENTS 4,939,595 7/1990 Yoshimoto et al. .................. 360/32

FOREIGN PATENT DOCUMENTS 58-164383 9/1983 Japan .

OTHER PUBLICATIONS

T. Fukami et al., "New LSIs for a Rotary-Head Digital Audio Tape Recorder (R-DAT) and their Signal Processing," Audio Engineering Society Preprint No. 2379, Audio Engineering Society (Nov. 1986).
H. Nakajima and M. Kosaka, "The DAT Conference, its Activities and Results," IEEE Transactions on Consumer Electronics, vol. CE-32, No. 3, pp. 404-415, (Aug. 1986).

Primary Examiner—Aristotelis Psitos
Assistant Examiner—Won Tae C. Kim
Attorney, Agent, or Firm—Philip M. Shaw, Jr.

[57] ABSTRACT

A digital signal processing circuit for use in different types of digital audio tape recorder that record a standard track format using different arrangements of rotary drum and the like. The circuit provides a record signal having a transmission speed and timing switched in accordance with the structure of the rotary drum and the like.

15 Claims, 14 Drawing Sheets

| MODE BYTE | LSI OPERATION STATUS |
|---|---|
| 0 0 — — — — — — | A TYPE |
| 0 1 — — — — — — | B TYPE |
| 1 0 — — — — — — | C TYPE |
| 1 1 — — — — — — | D TYPE |
| — — 0 0 1 0 0 0 | AFTER RECORDING MODE· NORMAL MODE |
| — — 0 0 1 1 0 0 | AFTER RECORDING MODE· MULTIPLE-SPEED MODE |
| — — 0 0 0 0 0 0 | REPRODUCING MODE· NORMAL MODE |
| — — 0 0 0 1 0 0 | REPRODUCING MODE· MULTIPLE-SPEED MODE |
| — — 0 1 — 0 — — | RECORDING MODE· NORMAL MODE |
| — — 0 1 — 1 — — | RECORDING MODE· MULTIPLE-SPEED MODE |
| — — 0 1 — — 0 — | START RECORDING |
| — — 0 1 — — 1 — | STANDBY |
| TEST SIGNAL RECORD MODE | |
| — — 1 1 1 0 0 0 | A, B ch   fch/2 RECORDING |
| — — 1 1 1 0 0 1 | A, B ch   fch/4 RECORDING |
| — — 1 1 1 0 1 0 | A, B ch   fch/6 RECORDING |
| — — 1 1 1 0 1 1 | A, B ch   fch/18 RECORDING |
| — — 1 1 1 1 0 0 | A, B ch   fch/72 RECORDING |
| — — 1 1 0 0 0 0 | A ch   fch/2 RECORDING |
| — — 1 1 0 0 0 1 | A ch   fch/4 RECORDING |
| — — 1 1 0 0 1 0 | A ch   fch/6 RECORDING |
| — — 1 1 0 0 1 1 | A ch   fch/18 RECORDING |
| — — 1 1 0 1 0 0 | A ch   fch/72 RECORDING |
| — — 1 0 1 0 0 0 | B ch   fch/2 RECORDING |
| — — 1 0 1 0 0 1 | B ch   fch/4 RECORDING |
| — — 1 0 1 0 1 0 | B ch   fch/6 RECORDING |
| — — 1 0 1 0 1 1 | B ch   fch/18 RECORDING |
| — — 1 0 1 1 0 0 | B ch   fch/72 RECORDING |

FIG. 3

| STATUS BYTE | LSI OPERATION |
|---|---|
| 0 0 — — — — — — | $f_S$ = 48 KHz |
| 0 1 — — — — — — | $f_S$ = 44.1 KHz |
| 1 0 — — — — — — | $f_S$ = 32 KHz |
| — — 0 0 — — — — | 2 ch |
| — — 0 1 — — — — | 4 ch |
| — — — — 0 0 — — | 16 bit LINEAR QUANTIZING |
| — — — — 0 1 — — | 12 bit NON-LINEAR QUANTIZING |
| — — — — — — 0 0 | $T_P$ = 13.6 μm |
| — — — — — — 0 1 | $T_P$ = 20.4 μm |
| 1 0 0 — 0 1 — — | LONG-PLAY MODE (LP MODE) |
| 0 1 — — — — 0 1 | 1.5 TIMES TRACK PITCH MODE |
| THE OTHER | STANDARD MODE (SP MODE) |

|  |  | A TYPE | B TYPE |
|---|---|---|---|
| REC. (NORMAL MODE) | LP MODE | N = 1000 rpm<br>$V_t$ = 4.075 mm/sec<br>R = 4.704 Mbps | N = 2000 rpm<br>$V_t$ = 4.075 mm/sec<br>R = 4.704 Mbps |
|  | SP MODE | N = 2000 rpm<br>$V_t$ = 8.150 mm/sec<br>R = 9.408 Mbps | N = 4000 rpm<br>$V_t$ = 8.150 mm/sec<br>R = 9.408 Mbps |
| REPROD. (NORMAL MODE) | LP MODE | N = 2000 rpm<br>$V_t$ = 4.075 mm/sec<br>R = 9.408 Mbps<br>SEMI NT SERVO | N = 4000 rpm<br>$V_t$ = 4.075 mm/sec<br>R = 9.408 Mbps<br>SEMI NT SERVO |
|  | SP MODE | N = 2000 rpm<br>$V_t$ = 8.150 mm/sec<br>R = 9.408 Mbps<br>ATF SERVO | N = 4000 rpm<br>$V_t$ = 8.150 mm/sec<br>R = 9.408 Mbps<br>ATF SERVO |
| M.-SPEED REC./REPROD. (M.-SPEED MODE REPROD. OR M.-SPEED MODE REC.) | LP MODE | N = 2000 rpm<br>$V_t$ = 8.150 mm/sec<br>R = 9.408 Mbps<br>TWICE-SPEED REC./REPROD. | N = 4000 rpm<br>$V_t$ = 8.150 mm/sec<br>R = 9.408 Mbps<br>TWICE-SPEED REC./REPROD. |
|  | SP MODE | — | — |
| AFTER REC. MODE | LP MODE | $V_t$ = 8.150 mm/sec<br>TWICE-SPEED AFTER REC. | $V_t$ = 8.150 mm/sec<br>TWICE-SPEED AFTER REC. |
|  | SP MODE | $V_t$ = 8.150 mm/sec | $V_t$ = 8.150 mm/sec |

FIG. 6A

|  |  | C TYPE | D TYPE |
|---|---|---|---|
| REC. (NORMAL MODE) | LP MODE | N = 1000 rpm<br>$V_t$ = 4.075 mm/sec<br>R = 2.352 Mbps | N = 1000 rpm<br>$V_t$ = 4.075 mm/sec<br>R = 2.352 Mbps |
|  | SP MODE | N = 2000 rpm<br>$V_t$ = 8.150 mm/sec<br>R = 4.704 Mbps | N = 2000 rpm<br>$V_t$ = 8.150 mm/sec<br>R = 4.704 Mbps |
| REPROD. (NORMAL MODE) | LP MODE | N = 4000 rpm<br>$V_t$ = 4.075 mm/sec<br>R = 9.408 Mbps<br>SEMI NT SERVO | N = 2000 rpm<br>$V_t$ = 4.075 mm/sec<br>R = 4.704 Mbps<br>SEMI NT SERVO |
|  | SP MODE | N = 4000 rpm<br>$V_t$ = 8.150 mm/sec<br>R = 9.408 Mbps<br>SEMI NT SERVO | N = 2000 rpm<br>$V_t$ = 8.150 mm/sec<br>R = 4.704 Mbps<br>ATF SERVO |
| M.-SPEED REC./REPROD. (M.-SPEED MODE REPROD. OR M.-SPEED MODE REC.) | LP MODE | N = 4000 rpm<br>$V_t$ = 16.30 mm/sec<br>R = 9.408 Mbps<br>FOUR TIMES-SPEED REC./REPROD. | N = 2000 rpm<br>$V_t$ = 8.150 mm/sec<br>R = 4.704 Mbps<br>TWICE-SPEED REC./REPROD. |
|  | SP MODE | N = 4000 rpm<br>$V_t$ = 16.30 mm/sec<br>R = 9.408 Mbps<br>TWICE-SPEED REC./REPROD | — |
| AFTER REC. MODE | LP MODE | $V_t$ = 16.30 mm/sec<br>FOUR TIMES-SPEED AFTER REC. | $V_t$ = 8.150 mm/sec<br>TWICE-SPEED AFTER REC. |
|  | SP MODE | $V_t$ = 16.30 mm/sec<br>TWICE-SPEED AFTER REC. | $V_t$ = 8.150 mm/sec |

FIG. 6 B

RECORD AND REPRODUCE SIGNAL PROCESSING CIRCUIT THAT IS PROGRAMMABLE ACCORDING TO THE HEAD DRUM CONFIGURATION OF THE DIGITAL AUDIO TAPE RECORDER IN WHICH IT IS USED

BACKGROUND OF THE INVENTION

The present invention relates to a digital signal processing circuit for use, for example in a magnetic recording and reproducing apparatus for recording and reproducing a digital audio signal with the use of a rotary drum (hereinafter referred to as "digital audio tape recorder" or "DAT").

While such a digital audio tape recorder can record and reproduce an audio signal in high density with deterioration in the quality of sound effectively prevented from occurring, it is unavoidable that the overall structure becomes complex. Therefore it is the industry practice to arrange such circuit blocks as the digital signal processing circuit and the servo circuit in integrated circuits to thereby simplify the overall structure.

Generally, in digital audio tape recorders, the magnetic heads are disposed on a rotary drum, having a diameter of 30 mm, at an angular distance of 180° and a magnetic tape is wound around the rotary drum at a wrap angle of 90°.

However, it is possible to miniaturize the DAT if an arrangement made up of a rotary drum being 15 mm in diameter with magnetic heads disposed thereon at an angular distance of 180° and a magnetic tape wound around the same at a wrap angle of 180° is used. With this arrangement, it is possible to obtain similar record tracks to those obtained with the use of the rotary drum being 30 mm in diameter.

However, when a rotary drum of 15 mm in diameter is used, the record signal must be supplied to the magnetic heads disposed on the rotary drum at a different timing from that when a rotary drum of 30 mm in diameter is used.

That is, there arises a problem that such a digital signal processing circuit becomes necessary which will output the record signal at a different timing depending on whether the rotary drum of 30 mm in diameter is used or the rotary drum of 15 mm in diameter is used.

As a measure to solve such a problem, it is considered to add a specific converter circuit to the digital signal processing circuit for changing the timing of the output so that only one type of digital signal processing circuit need be used for the cases where the rotary drum is 30 mm in diameter or 15 mm in diameter. In such a case, however, the overall structure becomes accordingly complex. Further, duplicated circuit portions are required in the converter circuit and the digital signal processing circuit and therefore, this arrangement is still insufficient for practical use.

SUMMARY OF THE INVENTION

In view of the foregoing, an object of the present invention is to provide a digital signal processing circuit which will be used in common for different mechanical organizations of a digital audio tape recorder with respect to different sized rotary drums or the like.

The foregoing objects and other objects of the invention have been achieved by the provision of a digital signal processing circuit for use in a digital signal recording apparatus for converting a digital signal to a record signal and then providing the record signal at a predetermined timing and transmission speed to magnetic heads mounted in a known arrangement on a rotary drum of a known diameter to record the digital signal on a magnetic tape wrapped around the rotary drum at a known wrap angle. The digital circuit of the present invention for processing the record signal switches the transmission speed and timing of the record signal in response to control data representative of the diameter of the rotary drum, the wrap angle of the magnetic tape wound around the rotary drum, and/or the arrangement of the magnetic heads on the rotary drum.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is a table showing the data arrangement of a mode byte;

FIG. 6 is a table for explaining the operations in various types of DATs;

FIGS. 20(A) to 22(B) are signal wave form charts similar to those of the preceding figures for explaining the operation of the record signal generating circuit depicted in FIG. 1 for the head arrangements of the types A, B, and C or D, respectively.

DETAILED DESCRIPTION OF THE INVENTION

An embodiment of the present invention will be described below in detail with reference to the accompanying drawings.

(1) Structure of a digital audio tape recorder

Figure 2:
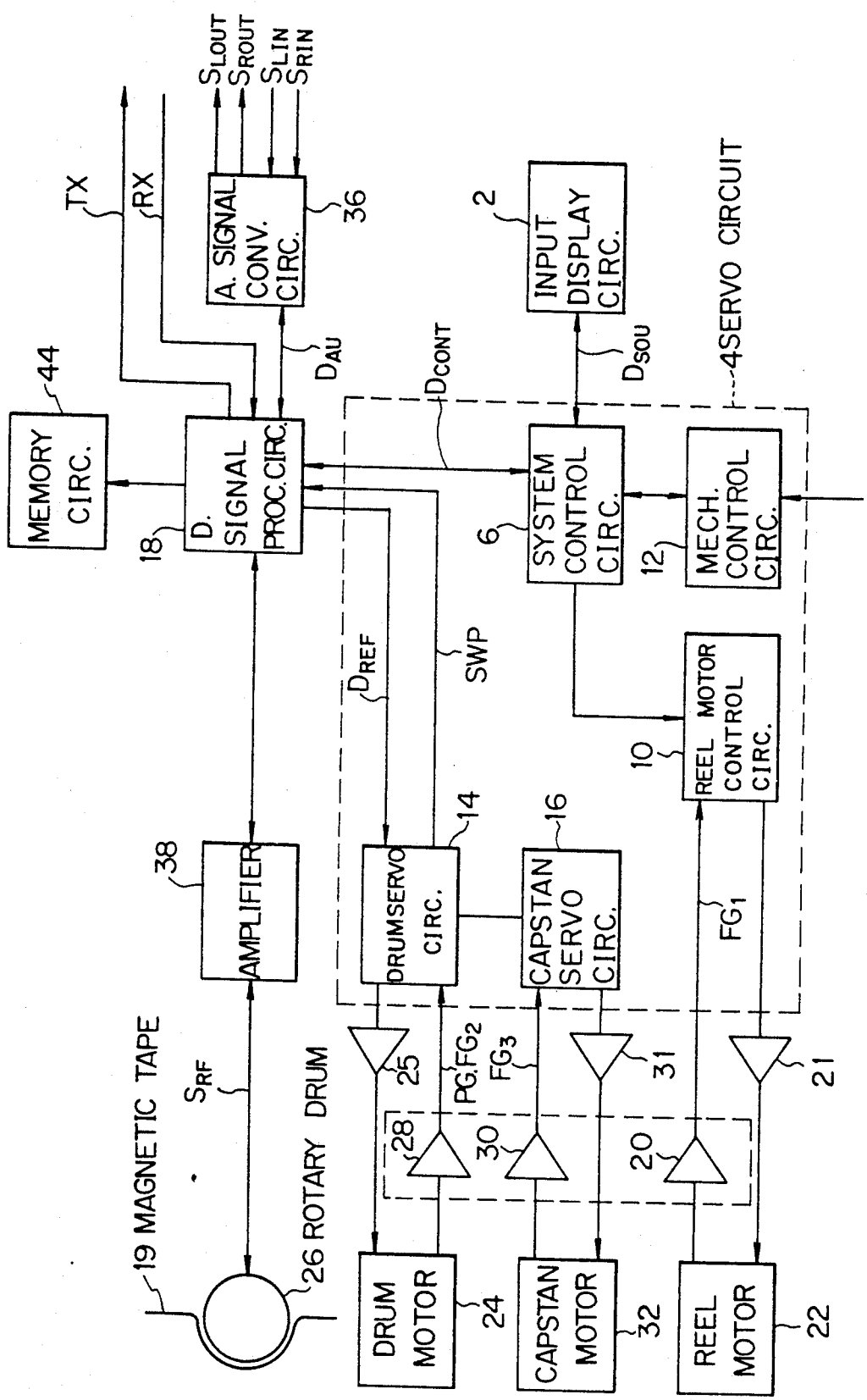
FIG. 2 is a block diagram showing a digital audio tape recorder in which the circuit depicted in FIG. 1 is employed.

Referring to FIG. 2, reference numeral 1 denotes the whole of a digital audio tape recorder, which converts an audio signal in a stereo system to a digital signal and records the digital signal.

In the digital audio tape recorder 1, an input display circuit 2, which includes a processor circuit, generates operating data $D_{SOU}$ in response to operation of operating devices and also changes the display on its display panel in accordance with the display data output from a system control circuit 6.

A servo circuit 4 is entirely arranged in an integrated circuit form and includes the system control circuit 6, a reel motor control circuit 10, a mechanical control circuit 12, a drum servo circuit 14 and a capstan servo circuit 16. The servo circuit 4 supplies the operating data $D_{SOU}$ to the system control circuit 6 structured of a processor circuit (not shown).

The system control circuit 6, at the time of recording data, generates control data $D_{CONT}$ in accordance with preset structural information corresponding to the structure, i.e. the diameter and head arrangement of the rotary drum and the like of the digital audio tape recorder 1 and the operating data $D_{SOU}$ and outputs the control data $D_{CONT}$ to the reel motor control circuit 10, the mechanical control circuit 12, the drum servo circuit 14, and the capstan servo circuit 16, which are internally connected, and to a digital signal processing circuit 18, which is externally connected to the servo circuit 4.

The system control circuit 6, at the time of reproduction of the recorded data, generates the control data $D_{CONT}$, other than a status byte, and outputs it to the digital signal processing circuit 18.

Further, at the time of reproduction of the recorded data, the system control circuit 6 takes the status byte data output from the digital signal processing circuit 18 and generates control data $D_{CONT}$ using it and supplies the control data to the reel motor control circuit 10, the mechanical control circuit 12, the drum servo circuit 14, and the capstan servo circuit 16.

Thus, the reel motor control circuit 10, the mechanical control circuit 12, the drum servo circuit 14, and the capstan servo circuit 16, at the time of recording, drive, mechanical portions such as the magnetic tape transport system of the digital audio tape recorder 1 in response to user operation, on the basis of the prescribed structural information and the operating data $D_{SOU}$.

On the other hand, the same elements, at the time of reproduction, drive the mechanical portions in response to the operation by the user and the mode of the digital audio signal recorded on the magnetic tape 19, on the basis of subcode data which has been recorded on the magnetic tape, the prescribed structural information, and the operating data $D_{SOU}$.

More specifically, the reel motor control circuit 10 drives the reel motor 20 in accordance with rotating speed information of the reel motor 22 input through an amplifier 20 (which information is formed of a frequency generator signal $FG_1$) and on the basis of the control data $D_{CONT}$ output from the system control circuit 6, whereby the reel of the magnetic tape cassette (not shown) is driven to rotate at a predetermined speed.

The mechanical control circuit 12 controls the operations of the tape cassette loading and ejecting mechanism, magnetic tape loading mechanism, and the like (not shown) in accordance with the control data $D_{CONT}$ output from the system control circuit 6.

The drum servo circuit 14, through the amplifier 25, controls the operation of the drum motor 24 in accordance with the control data $D_{CONT}$ output from the system control circuit 6, thereby driving a rotary drum 26 to rotate at a predetermined speed.

At this time, the drum servo circuit 14 accepts from the drum motor 24 a frequency generated signal $FG_2$, whose signal level rises at intervals of one rotation of the rotary drum 26, and a PG (pulse generator) signal, whose signal level rises at intervals of a predetermined angle of rotation of the rotary drum 26, through the amplifier 28. On the basis of these signals, the drum servo circuit 14 generates a switching pulse signal SWP whose signal level changes at intervals of one rotation of the rotary drum 26.

The drum servo circuit 14 further controls the operation of the drum motor 24 so that the phase of the switching pulse signal SWP becomes a predetermined phase referenced from the rotary drum reference signal $D_{REF}$ output from the digital processing circuit 18, thereby driving the rotary drum 26 to rotate at a predetermined speed in synchronism with the timing of the signal processing in the digital signal processing circuit 18.

The rotary drum reference signal $D_{REF}$ is formed of a reference signal, having a duty factor of 50%, recurring at an interleave period.

Therefore, when a set of magnetic heads are disposed on the rotary drum 26 at an angular distance of 180° and record tracks are formed in succession at intervals of a rotation of 180° of the rotary drum 26, the control is such that the switching pulse signal SWP can synchronize with the rotary drum reference signal $D_{REF}$.

On the other hand, during reproduction of the signals recorded in the tape 19, the capstan servo circuit 16, on the basis of the pilot signal for ATF (automatic track finding) tracking control extracted from the reproduced signal $S_{RF}$, the frequency generated signal $FG_3$ input through the amplifier 30 from the capstan motor 32, and the control data $D_{CONT}$ output from the system control circuit 6, drives the capstan motor 32 to rotate so that the magnetic tape 19 is moved at a predetermined speed and tracking control is performed.

(2) Structure of control data

The control data $D_{CONT}$ is formed of serial data, whose predetermined bytes are assigned to a mode byte and a status byte, each being formed of 8 bits.

In the mode byte as shown in FIG. 3, the high-order two bits represent the diameter of the rotary drum 26 and the arrangement of the magnetic heads. The value set up in advance in the servo circuit 12 on the basis of the structure of the rotary drum or the like of the digital audio tape recorder 1 is output from the system control circuit 6 as two-bit data.

More specifically, when the bits are "00", "01", "10", and "11", they mean that the arrangement of the rotary drum 26 and the magnetic heads constituting the digital audio tape recorder 1 is of type A, type B, type C, and type D, respectively.

The third bit indicates, when it is "1", that the digital audio tape recorder 1 is in a test signal recording mode.

When the third bit is "0", the fourth bit indicates, when it is "1", that the apparatus is in the state of reproduction, the fifth bit indicates, when it is "1", that the apparatus is in the state of recording, and the sixth bit indicates whether the apparatus is in the normal mode ("0") in which recording and reproduction are performed at the normal recording and reproducing speeds or it is in the multiple-speed mode ("1") in which recording and reproduction are performed at two times the speeds in the normal mode.

Thus, it is arranged such that, when the mode byte is "--001000" or "--001100", it is detected that the apparatus is in the after record mode for recording subcode data in the normal mode or in the multiple-speed mode, respectively, and when it is "--01-0--" or "--01-1--", it is detected that the apparatus is in the recording mode in the normal mode or in the multiple-speed mode, respectively.

When the mode byte is "--01--0-" or "--01--1-", it indicates that the apparatus is in the state to start recording or in a standby state for recording, respectively. The bit "-" means that bit's data can be either "0" or "1".

Figures 4, 5:
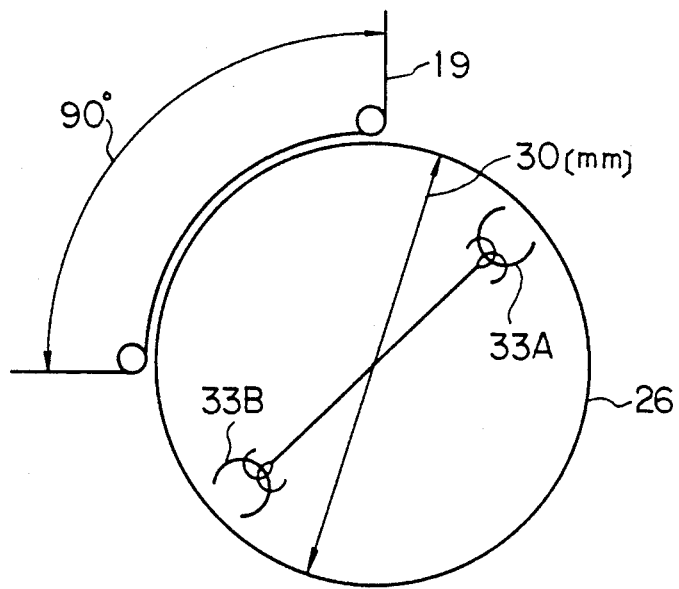
FIG. 4 is a table showing the data arrangement of a status byte.
FIG. 5 is a schematic plan view showing a structure of the rotary drum of a type A head arrangement.

The status byte as shown in FIG. 4, is generated, at the time of recording, in the system control circuit 6 on the basis of the operating data $D_{SOU}$, whereas at the time of reproduction and after recording, it is generated in the digital signal processing circuit 18 on the basis of the data of the subcode recorded on the magnetic tape 19.

In the status byte the high-order two bits represent the sampling frequency $f_s$ of the digital audio signal, and the following two bits represent the number of channels of the audio signal which the digital audio tape recorder processes for recording and reproduction.

To the fifth and sixth bits are assigned the data for identifying the quantization process, e.g. 16 bit linear quantizing or 12 bit non-linear quantizing, respectively, used when the audio signal is converted to the digital audio signal and, conversely, the digital audio signal is converted to the audio signal, and the seventh and eighth bits are designed to identify the track pitch $T_F$.

Thus, when the status byte is "100-01--", it is known that the case is where an audio signal of two channels is subjected to a 16-bit non-linear quantization process at a sampling frequency of 32 kHz, and that the case is where recording is made in a long-play mode (hereinafter referred to as "LP mode") or a magnetic tape recorded in the LP mode is reproduced.

Further, when the status byte is "01----01", the mode is known to be a 1.5-times track pitch mode in which a magnetic tape recorded at 1.5 times the ordinary track pitch is reproduced. When the status byte is other than "100-01--" and "01----01" it is known that the case is where recording is made in a standard-play mode (hereinafter referred to as "SP mode") or a magnetic tape recorded in the SP mode is reproduced.

(1-1-1) Operation of the drum servo circuit and capstan servo circuit in the type A The type A head arrangement indicated by the high-order two bits ("00") of the mode byte is arranged, as shown in FIG. 5, such that a pair of heads, i.e. an A head and a B head 33A and 33B, respectively, with different azimuth angles are disposed at an angular distance of 180° on the rotary drum 26 having a diameter of 30 mm, and the magnetic tape 19 is wound around the rotary drum 26 at a wrap angle of 90°.

Therefore, the A and B heads 33A and 33B alternately scan the magnetic tape 19 every other period, the period being the time during which the rotary drum 26 rotates 90°.

At this time, as shown in FIG. 6 under the column designated "A type", the drum servo circuit 14 and the capstan servo circuit 16 switch their operations in accordance with the data of the mode byte and the status byte and in the LP mode recording of the normal mode, the drum motor 24 and the capstan motor 32 operate so that the rotating speed N of the rotary drum 26 becomes 1000 rpm and the traveling speed $V_t$ of the magnetic tape 19 becomes 4.075 mm/sec.

Figure 7:
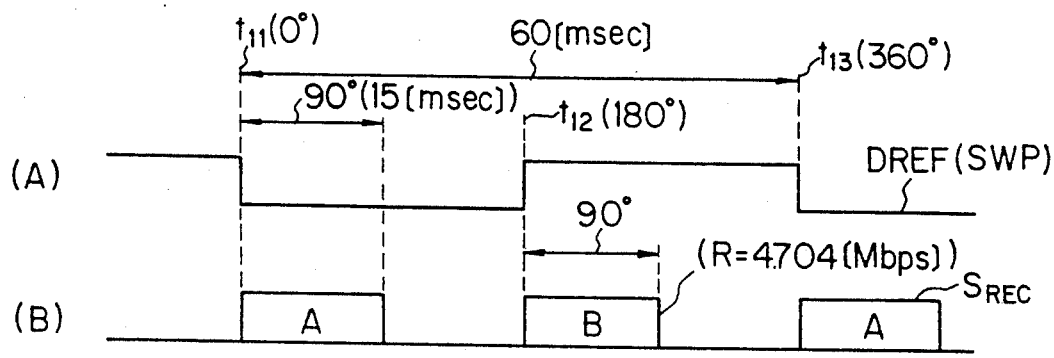
FIGS. 7(A) and 7(B) are signal wave form charts showing the operation of the type A head arrangement during the LP mode recording of the normal mode, with FIG. 7(A) showing both the rotary drum reference signal ($D_{REF}$) and the switching pulse signal (SWP) and FIG. 7(B) showing the record signal ($S_{REC}$)

Therefore, as shown in FIGS. 7A and 7B, the rotary drum 26 makes one rotation in 60 msec in synchronism with the rotary drum reference signal $D_{REF}$(FIG. 7(A)) (which, in this case, agrees with the switching pulse signal SWP).

Meanwhile, the magnetic heads 33A and 33B scan the magnetic tape 19 such that the A head 33A scans the magnetic tape 19 for the period of 15 msec, during which the rotary drum 26 rotates 90°, from the point of time $t_{11}$ when the rotary drum reference signal $D_{REF}$ falls, whereas the B head 33B scans the magnetic tape 19 for the period of 15 msec, during which the rotary drum 26 rotates 90° from the point of time $t_{12}$ when the rotary drum reference signal $D_{REF}$ rises.

In the SP mode recording of the normal mode, the drum servo circuit 14 and the capstan servo circuit 16 drive the drum motor 24 and the capstan motor 32, respectively, so that the rotating speed N of the rotary drum 26 becomes 2000 rpm and the traveling speed $V_t$ of the magnetic tape 19 becomes 8.150 mm/sec.

Accordingly, in the SP mode, as shown in FIGS. 8(A)-(D), the rotary drum 26 makes one rotation in 30 msec, and meanwhile, the A head 33A scans the magnetic tape 19 for the period of 7.5 msec, during which the rotary drum 26 rotates 90°, from the point of time $t_{21}$ when the rotary drum reference signal $D_{REF}$ falls, whereas the B head 33B scans the magnetic tape 19 for the period of 7.5 msec, during which the rotary drum 26 rotates 90°, from the point of time $t_{22}$ when the rotary drum reference signal $D_{REF}$ rises.

In this way, in the normal mode recording of the type A, record tracks are successively formed in the format standardized for the digital audio tape recorder by successively supplying record signals $S_{REC}$(FIG. 7(B) and FIG. 8(B)) to the magnetic heads 33A and 33B during the periods that the magnetic heads 33A and 33B scan the magnetic tape 19.

The characters A and B in FIG. 7(B) and FIGS. 8(B), (C) represent recorded/reproduced signals by the A and B heads 33A and 33B, respectively.

To repeat, in the normal mode reproduction, the drum motor 24 is driven so that the rotating speed N of the rotary drum 26 becomes 2000 rpm and the capstan motor 32 is driven so that the traveling speed $V_t$ of the magnetic tape 19 becomes 4.075 mm/sec or 8.150 mm/sec in the LP mode or in the SP mode, respectively.

In the reproducing mode, the rotary drum 26 is rotated at the same timing as that during recording in the SP mode. Hence, the magnetic heads 33A and 33B when reproducing the magnetic tape 19 recorded in the SP mode, scan the magnetic tape 19 so as to draw the same scanning loci as those drawn at the time of recording, and thus, the reproduced signal $S_{RF}$ obtained through the magnetic heads 33A and 33B is successively demodulated and an audio signal is reproduced.

In this case, the capstan servo circuit 16, when reproducing the magnetic tape 19 recorded in the SP mode, uses the ATF tracking servo method (hereinafter referred to as "ATF servo") to control the operation of the capstan motor 32, so that tracking control of the magnetic heads 33A and 33B is positively performed.

When a tape 19 recorded in the LP mode is reproduced, since the magnetic tape 19 travels at ½ the traveling speed on recording, each of the magnetic heads 33A and 33B scans the magnetic tape 19 two times while the magnetic tape 19 travels one record track portion.

Figure 9:
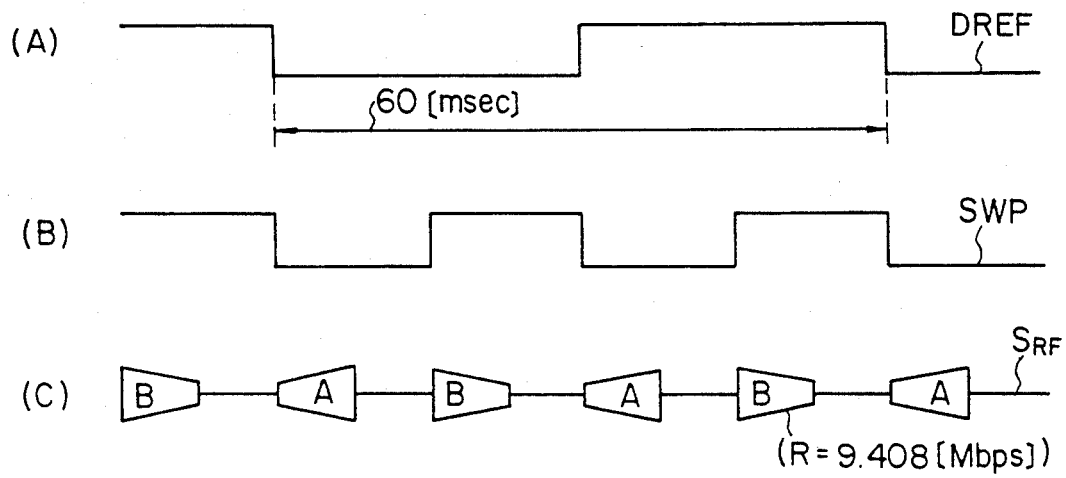
FIGS. 9(A) to 9(C) are signal wave form charts showing the operation of the type A head arrangement during the reproduction of a tape recorded in the LP mode of the normal mode, with FIG. 9(A) showing the rotary drum reference signal ($D_{REF}$), FIG. 9(B) showing the switching pulse signal (SWP) and FIG. 9(C) showing the reproduced signal ($S_{RF}$)

Therefore, the capstan servo circuit 16, as shown in FIGS. 9(A)-(C), controls the operation of the capstan motor 32 so that the switching pulse signal SWP (FIG. 9(B)) exhibits two periods of changes during one period of the rotary drum reference signal $D_{REF}$(FIG. 9(A)). Thus, tracking control is performed such that the magnetic heads 33A and 33B positively scan predetermined record tracks two times each (which control method will hereinafter be referred to as "semi NT servo")

In the case of the multi-speed recording/reproducing mode, in which high-speed dubbing of an audio signal is performed by recording or reproducing a tape at a recording/reproducing speed 2 times as high as that on recording (namely, consisting of 2 times-speed mode recording and 2 times-speed mode reproduction), the drum servo circuit 14 and the capstan servo circuit 16 drive the drum motor 24 and the capstan motor 32, respectively, so that the rotating speed N of the rotary drum 26 becomes 2000 rpm and the traveling speed $V_t$ of the magnetic tape 19 becomes 8.150 mm/sec.

Thereby, with the traveling speed of the magnetic tape 19 relative to the rotating speed of the rotary drum 26 kept at the same value as that in the LP mode recording, the magnetic tape 19 is moved at a traveling speed switched to double that speed, and thus, recording/reproduction of an audio signal at 2 times the recording-/reproducing speed in the LP mode recording is achieved.

Figure 8:
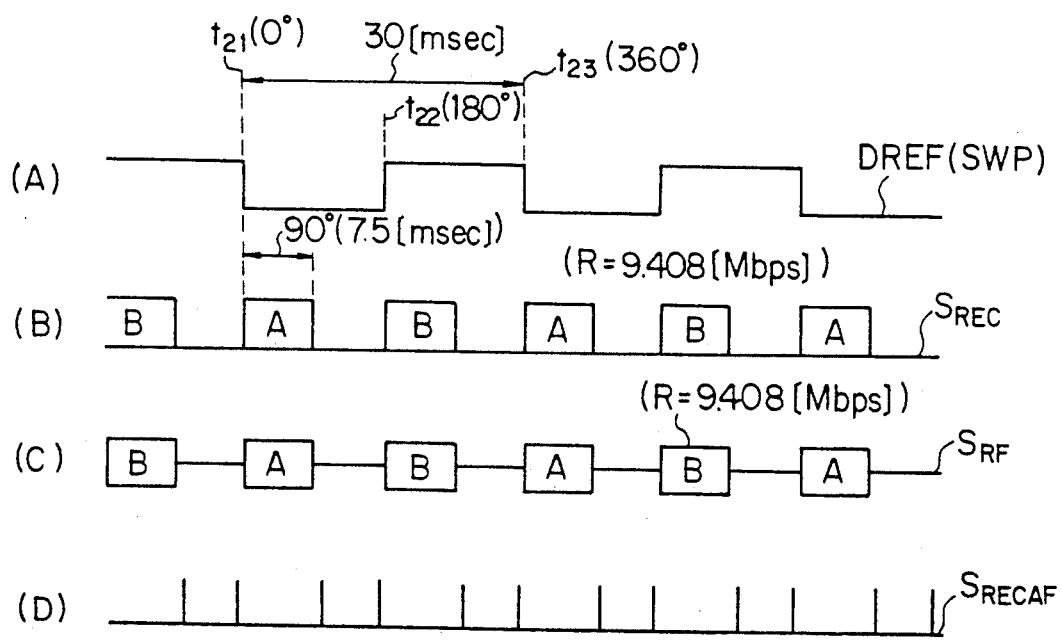
FIGS. 8(A) to 8(D) are signal wave form charts showing the operation of the type A head arrangement during the SP mode recording of the normal mode, with FIG. 8(A) showing both the rotary drum reference signal ($D_{REF}$) and the switching pulse signal (SWP), FIG. 8(B) showing the record signal ($S_{REC}$), FIG. 8(C) showing the reproduced signal ($S_{RF}$), and FIG. 8(D) showing the record signal in the after recording mode ($S_{RECAF}$)

Therefore, in the multiple-speed recording/reproducing mode, the rotary drum 26 and the magnetic heads 33A and 33B operate at the same timing as that in the SP mode recording and reproduction (FIGS. 8(A-)-(D)).

In the case of the after recording mode for recording subcode data, the drum servo circuit 14 and the capstan servo circuit 16 control the operation of the drum motor 24 and the capstan motor 32, respectively, so that the traveling speed $V_t$ of the magnetic tape 19 and the rotating speed N of the rotary drum 26 become the same as those in the multiple-speed recording/reproducing mode.

Thus, in the after recording mode, the rotary drum 26 and the capstan motor 32 are driven at the same timing as that in the SP mode recording (FIGS. 8(A)-(D)) and thereby, subcode data is recorded while the magnetic tape recorded in the LP mode or SP mode is being reproduced under the ATF servo control.

Thus, the drum servo circuit 14 and the capstan servo circuit 16 drive the rotary drum 26 ad the magnetic tape 11 at predetermined speeds in accordance with the operating mode information and structural information of the digital audio tape recorder detected from the control data $D_{CONT}$.

Figure 10:
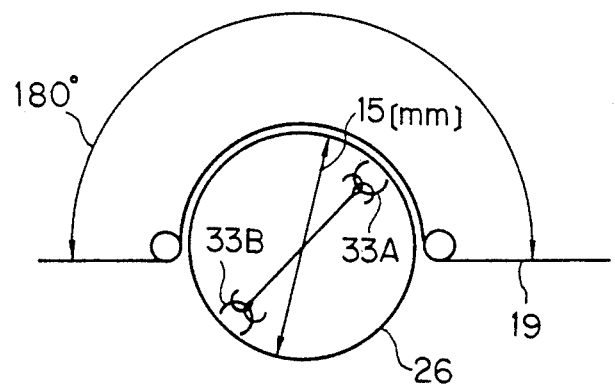
FIG. 10 is a schematic plan view showing a head arrangement of the rotary drum of the types B, C, and D.

(1-1-2) Operation of the drum servo circuit and capstan servo circuit in the type B In the type B, as shown in FIG. 10, the A and B heads 33A and 33B are disposed at an angular distance of 180° and with an offset of ½ of the track pitch on a rotary drum 26 having a diameter of 15 mm, and the magnetic tape 19 is wound around the rotary drum 26 at a wrap angle of 180°.

Therefore, the A and B heads 33A and 33B alternately scan the magnetic tape 19 at intervals of the period during which the rotary drum 26 makes a half rotation.

At this time, the drum servo circuit 14 and the capstan servo circuit 16 operate in accordance with the data of the mode byte and the status byte and in the LP mode recording of the normal mode, drive the drum motor 24 and the capstan motor 32, respectively, so that the rotating speed N of the rotary drum 26 becomes 2000 rpm and the traveling speed $V_t$ of the magnetic tape 19 becomes 4.075 mm/sec.

Further, in the SP mode recording of the normal mode, the drum servo circuit 14 and the capstan servo circuit 16 drive the drum motor 24 and the capstan motor 32, respectively, so that the rotating speed N of the rotary drum 26 becomes 4000 rpm and the traveling speed $V_t$ of the magnetic tape 19 becomes 8.150 mm/sec.

Therefore, in the type B, the magnetic tape 19 travels during the period that the rotary drum 26 makes two rotations, a distance corresponding to the distance it travels during the period of one rotation in the type A. Since the ½ track pitch offset is provided between the magnetic heads 33A and 33B, by supplying the record signal to the magnetic heads 33A and 33B continuously during the first rotation of the two rotations made by the rotary drum 26, record tracks are formed in succession in the format standardized for the digital audio tape recorder.

Figure 11:
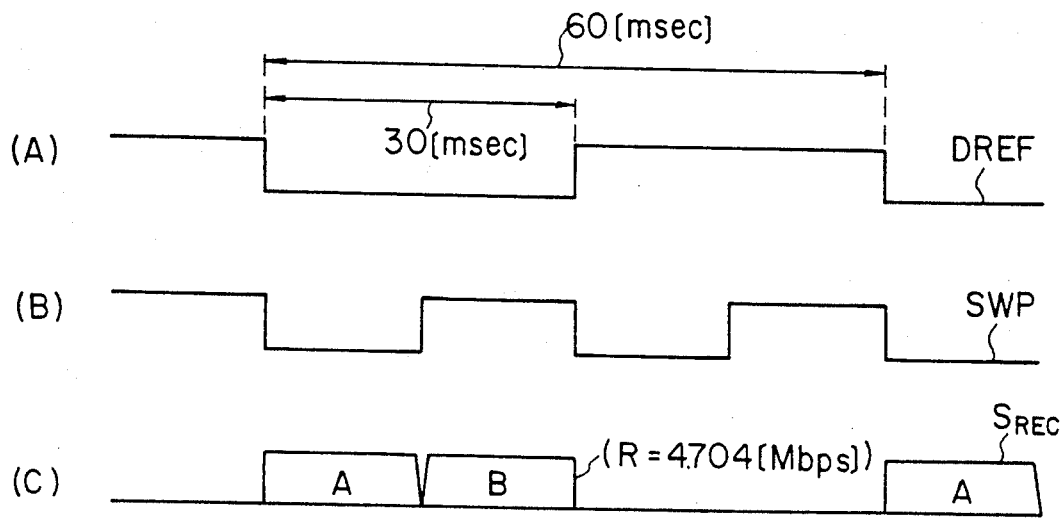
FIGS. 11(A) to 11(C) are signal wave form charts showing the operation of the type B head arrangement during the LP mode recording of the normal mode, with FIG. 11(A) showing both the rotary drum reference signal ($D_{REF}$), FIG. 11(B) showing the switching pulse signal (SWP), and FIG. 11(C) showing the record signal ($S_{REC}$)
Figure 12:
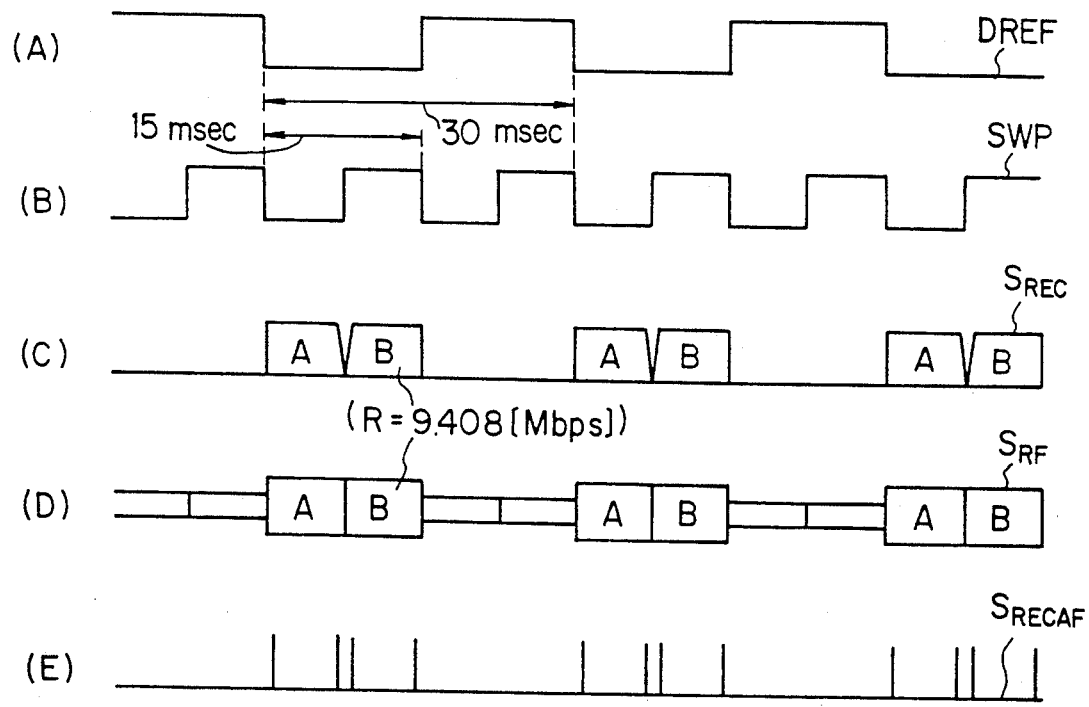
FIGS. 12(A) to 12(E) are signal wave form charts showing the operation of the type B head arrangement during the SP mode recording of the normal mode, with FIG. 12(A) showing the rotary drum reference signal ($D_{REF}$), FIG. 12(B) showing the switching pulse signal (SWP), FIG. 12(C) showing the record signal ($S_{REC}$), FIG. 12(D) showing the reproduced signal ($S_{RF}$), and FIG. 12(E) showing the record signal in the after recording mode ($S_{RECAF}$)

Therefore, as shown in FIGS. 11(A)-(C) and 12(A)-(E), for the LP mode and the SP mode, respectively, of the normal recording mode, the rotary drum 26 is driven to rotate such that one period of the rotary drum reference signal $D_{REF}$ (FIG. 11(A) and FIG. 12(A)) corresponds to two periods of the switching pulse signals SWP (FIG. 11(B) and FIG. 12(B)) and the rotary drum 26 makes one rotation in 30 msec or 15 msec, respectively.

Meanwhile, the magnetic heads 33A and 33B are supplied with the record signals $S_{REC}$ (FIG. 11(C) and FIG. 12(C)) during the period of the first rotation of the two rotations made by the rotary drum 26, and thereby record tracks are formed in succession.

In the normal mode reproduction, the drum motor 24 is driven so that the rotating speed N of the rotary drum 26 becomes 4000 rpm and the capstan motor 32 is driven so that the traveling speed $V_t$ of the magnetic tape 19 becomes 4.075 mm/sec or 8.150 mm/see in the LP mode or the SP mode, respectively.

Therefore, in the reproduction mode, the rotary drum 26 is rotated at the same timing as that in the SP mode recording of the normal mode (FIGS. 12(A)-(E) and FIGS. 13(A)-(C)).

Hence, the capstan servo circuit 16, when reproducing the magnetic tapes 19 recorded in the LP mode and in the SP mode, performs tracking control selecting the semi NT servo method and the ATF servo method, respectively.

In the case of the multiple-speed recording/reproducing mode, the drum servo circuit 14 and the capstan servo circuit 16 drive the drum motor 24 and the capstan motor 32, respectively, so that the rotating speed of the rotary drum 26 becomes 4000 rpm and the traveling speed $V_t$ of the magnetic tape 19 becomes 8.150 mm/sec.

Therefore, the rotating speed of the rotary drum 26 and the traveling speed of the magnetic tape 19 are set to be 2 times those in the LP mode recording of the "normal mode" (FIGS. 12(A)-(E)) and thus, recording and reproduction at 2 times the recording/reproducing speed in the LP mode recording of the normal mode is achieved.

In the case of the after recording mode for recording subcode data, the drum servo circuit 14 and the capstan servo circuit 16 control the operation of the drum motor 24 and the capstan motor 32, respectively, so that the traveling speed $V_t$ of the magnetic tape 19 and the rotating speed N of the rotary drum 26 become the same values as in the multiple-speed recording/reproducing mode.

Thus, in the after recording mode, the subcode data is recorded again while the magnetic tape recorded in the LP mode or the SP mode is reproduced under the ATF servo control.

As described above, in the type B, just as in the type A, the drum servo circuit 14 and the capstan servo circuit 16 drive the drum motor 24 and the capstan motor 32, respectively, in accordance with operating mode information and structural information of the digital audio tape recorder 1 detected from the control data $D_{CONT}$.

(1-1-3) Operation of the drum servo circuit and capstan servo circuit in the type C The type C corresponds to the arrangement of the type B but without the offset provided between the magnetic heads 33A and 33B.

In this case, the drum servo circuit 14 and the capstan servo circuit 16, in the LP mode recording of the normal mode, drive the drum motor 24 and the capstan motor 32, respectively, so that the rotating speed N of the rotary drum 26 becomes 1000 rpm and the traveling speed $V_t$ of the magnetic tape 19 becomes 4.075 mm/sec. In the SP mode recording of the normal mode, the drum motor 24 and the capstan motor 32 are driven so that the rotating speed N of the rotary drum 26 becomes 2000 rpm and the traveling speed $V_t$ of the magnetic tape 19 becomes 8.150 mm/sec Therefore, the rotary drum 26 makes one rotation in each of the LP mode and the SP mode, in 60 msec or 30 msec, respectively, in synchronism with the rotary drum reference signal $D_{REF}$ (FIG. 14(A) or FIG. 15(A)).

The magnetic heads 33A and 33B alternately scan the magnetic tape 19 during the periods that the signal level of the rotary drum reference signal $D_{REF}$ is held at high level and a low level, respectively, and, by supplying the record signal to each of the magnetic heads 33A and 33B at that time, record tracks are formed in succession in a standardized format for the digital audio tape recorder.

In the normal mode reproduction, the drum motor 24 is driven so that the rotating speed N of the rotary drum 26 becomes 4000 rpm and the capstan motor 32 is driven so that the traveling speed $V_t$ of the magnetic tape 19 in the LP mode and the SP mode becomes 4.075 mm/sec and 8.150 mm/sec, respectively.

Figure 16:
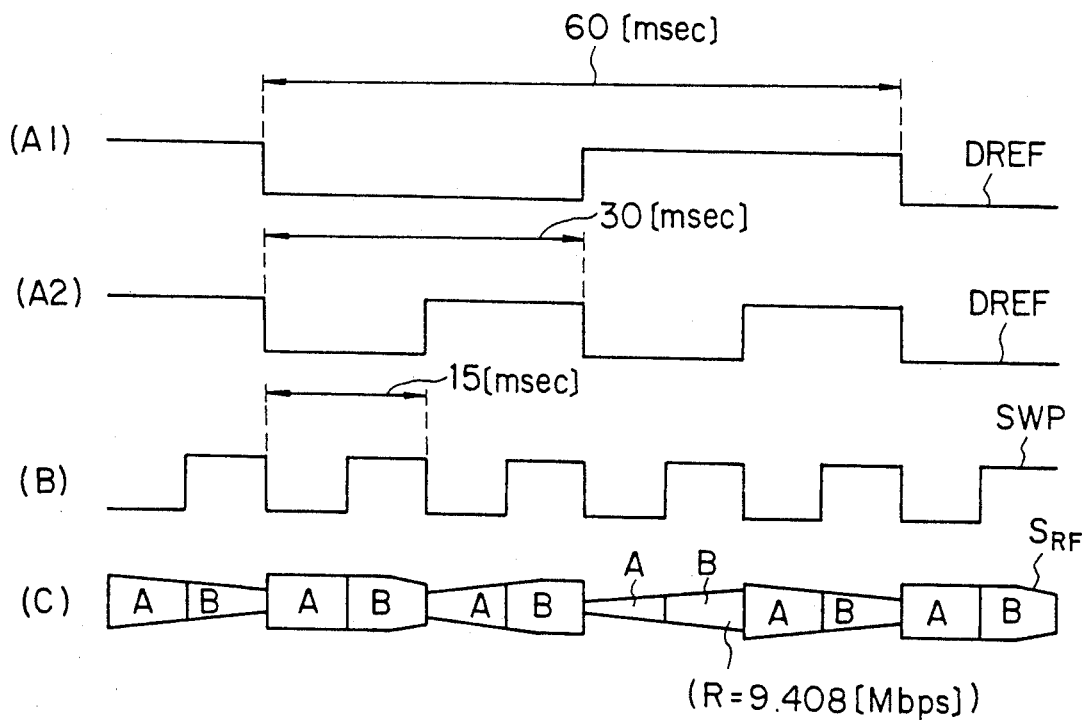
FIGS. 16(A1) to 16(C) are signal wave form charts showing the operation of the type C head arrangement during the reproduction of a tape recorded in the LP and SP modes of the normal mode, with FIG. 16(A1) showing the rotary drum reference signal ($D_{REF}$) in the LP mode and FIG. 16(A2) showing the rotary drum reference signal ($D_{REF}$) in the SP mode, FIG. 16(B) showing the switching pulse signal (SWP) and FIG. 16(C) showing the reproduced signal ($S_{RF}$) in both modes.

Hence in the reproducing mode, as shown in FIGS. 16(A1)–(C), the rotary drum 26 makes one rotation in 15 msec such that one period of reference drum signals $D_{REF}$ (FIG. 16 (A1) and (A2)) become, in each of the LP and SP modes, respectively, two periods and four periods of the switching pulse signal SWP (FIG. 16(B), and thus, tracking control is performed by the semi NT servo.

In the multiple-speed recording/reproducing mode, the drum servo circuit 14 and the capstan servo circuit 16 drive the drum motor 24 and the capstan motor 32, respectively, so that the rotating speed N of the rotary drum 26 becomes 4000 rpm and the traveling speed $V_t$ of the magnetic tape 19 becomes 16.30 mm/sec.

Figure 17:
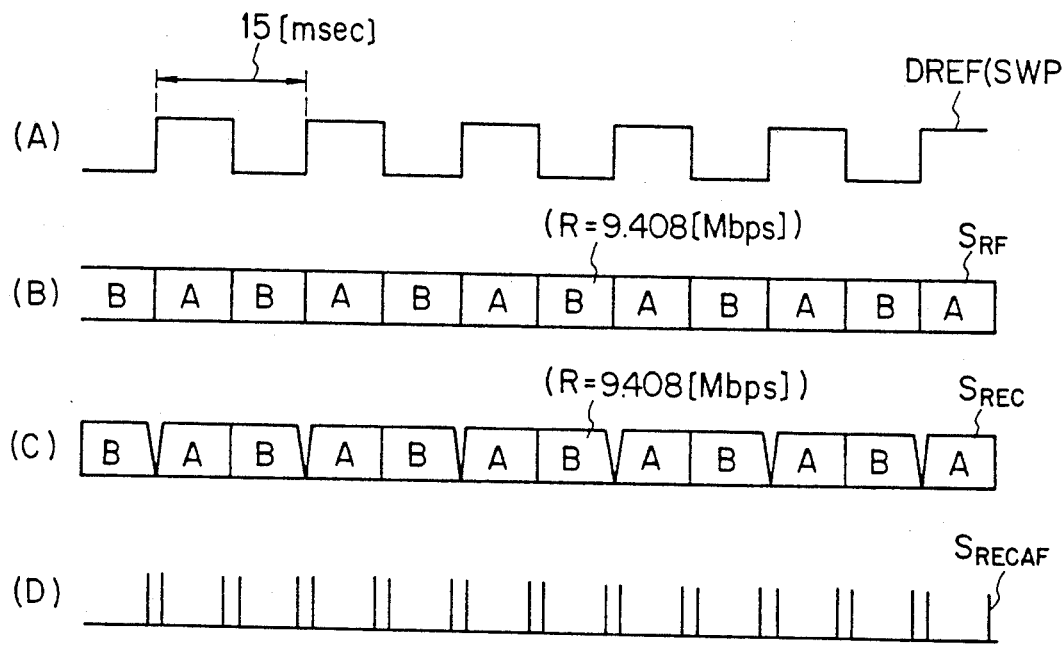
FIGS. 17(A) to 17(D) are signal wave form charts showing the operation of the type C head arrangement during the multiple-speed recording/reproducing mode, in either of the LP mode or the SP mode, with FIG. 17(A) showing both the rotary drum reference signal ($D_{REF}$) and the switching pulse signal (SWP), FIG. 17(B) showing the reproduced signal ($S_{RF}$), FIG. 17(C) showing the record signal ($S_{REC}$), and FIG. 17(D) showing the record signal in the after recording mode ($S_{RECAF}$)

Therefore, in the multiple-speed recording/reproducing mode, as shown in FIGS. 17(A)–(D), both the magnetic heads 33A and 33B, in either the LP mode or the SP mode, scan the record track during the period in which the rotary drum 26 makes one rotation in 15 msec in synchronism with the reference drum signal $D_{REF}$ (FIG. 17(A)) and thereby recording and reproduction is achievable at recording/reproducing speeds four times and two times as high as that at the time of recording, respectively.

In the after recording mode for recording subcode data, the drum servo circuit 14 and the capstan servo circuit 16 control the operation of the drum motor 24 and the capstan motor 32, respectively, so that the traveling speed $V_t$ of the magnetic tape 19 and the rotating speed N of the rotary drum 26 becomes the same as those in the multiple-speed recording/reproducing mode.

Thus, in the after recording mode, the rotary drum 26 and the capstan motor 32 are driven at the same timing as that in the SP mode recording, and thereby, the subcode data is recorded again while the magnetic tape 19 recorded in the LP mode or the SP mode is being reproduced under the ATF servo control.

(1-1-4) Operation of the drum servo circuit and capstan servo circuit in the type D The type D uses a rotary drum 26 of the same structure as that of the type C but the rotating speed N of the rotary drum 26 is made lower than type C during reproduction.

More specifically, the drum servo circuit 14 and the capstan servo circuit 16, in the normal mode recording, drive the rotary drum motor 24 and the capstan motor 32, respectively, in the same conditions as in the type C. In the normal mode reproduction, however, the drum servo circuit 14 and the capstan servo circuit 16 drive the drum motor 24 so that the rotating speed N of the rotary drum 26 becomes 2000 rpm, which is ½ of the corresponding value for the type C arrangement and drive the capstan motor 32 so that the traveling speed $V_t$ of the magnetic tape 19 becomes 4.075 mm/sec and 8.150 mm/sec in the LP mode and the SP mode, respectively.

Figure 18:
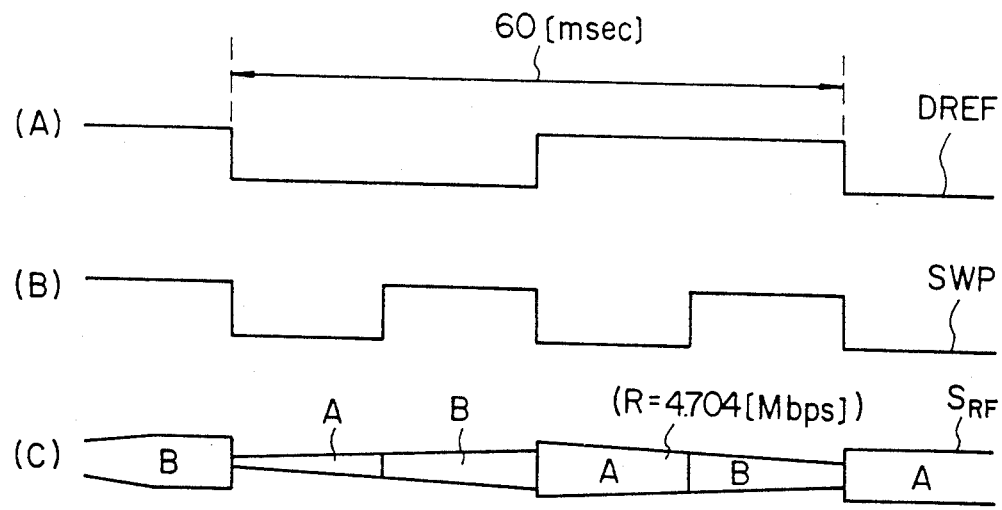
FIGS. 18(A) to 18(C) are signal wave form charts showing the operation of the type D head arrangement during the reproduction of a tape recorded in the LP mode of the normal mode, with FIG. 18(A) showing the rotary drum reference signal ($D_{REF}$), FIG. 18(B) showing the switching pulse signal (SWP) and FIG. 18(C) showing the reproduced signal ($S_{RF}$)

Hence, when the magnetic tape 19 recorded in the LP mode is reproduced, as shown in FIGS. 18(A)–(C), the rotary drum 26 is controlled such that one period of the rotary drum reference signal $D_{REF}$ (FIG. 18(A)) corresponds to two periods of the switching pulse signal SWP (FIG. 18(B)) and a reproduced signal $S_{RF}$ (FIG. 18(C)) is obtained with the tracking control performed by the semi NT servo.

Figure 19:
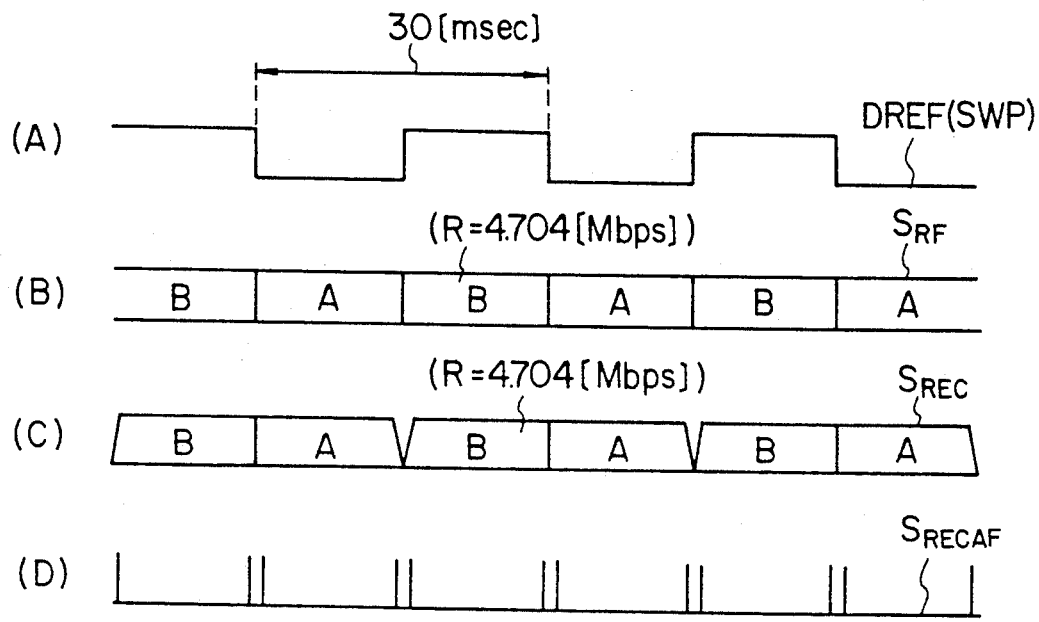
FIGS. 19(A) to 19(D) are signal wave form charts showing the operation of the type D head arrangement when the magnetic tape recorded in the SP mode is reproduced, with FIG. 19(A) showing both the rotary drum reference signal ($D_{REF}$) and the switching pulse signal (SWP), FIG. 19(B) showing the reproduced signal ($S_{RF}$), FIG. 19(C) showing the record signal ($S_{REC}$), and FIG. 19(D) showing the record signal in the after recording mode ($S_{RECAF}$)

On the other hand, when the magnetic tape 19 recorded in the SP mode is reproduced, as shown in FIGS. 19(A)–(D), the rotary drum 26 rotates such that the rotary drum reference signal $D_{REF}$ and the switching pulse signal $S_{RF}$ (FIG. 19(A)) come into phase and a reproduced signal $S_{RF}$ (FIG. 19(B)) is obtained with the tracking control performed by the ATF servo.

In the multiple-speed recording/reproducing mode, the drum servo circuit 14 and the capstan servo circuit 16 control the drum motor 24 and the capstan motor 32, respectively, so that the rotating speed N of the rotary drum 26 becomes 2000 rpm and the traveling speed $V_t$ of the magnetic tape 19 becomes 8.150 mm/sec.

Hence, the rotating speed of the rotary drum 26 and the traveling speed of the magnetic tape 19 in the recording of the multiple-speed recording/reproducing mode are maintained at 2 times the speeds in the LP mode of the normal mode, and thus, recording and reproduction at 2 times the recording/reproducing speeds in the normal mode is made with the tracking control performed by the ATF servo (FIGS. 19(A)–(D)).

Further, in the after recording mode for recording subcode data, the drum servo circuit 14 and the capstan servo circuit 16 control the operation of the rotary drum motor 24 and the capstan motor 32, respectively, so that the traveling speed $V_t$ of the magnetic tape 19 and the rotating speed of the rotary drum 26 become the same as those in the multiple-speed recording/reproducing mode.

Thus, the drum servo circuit 14 and the capstan servo circuit 16 detect the structure of the rotary drum 26 depending on the control data $D_{CONT}$ and drive the drum motor 24 and the capstan motor 32, respectively, in accordance with the result of the detection and the operating mode.

(1-2) Processing of the digital audio signal

Referring again to FIG. 2, a digital signal converter circuit 36 is composed of an analog to digital converter, a digital to analog converter, and a digital filter circuit (not shown). In the recording mode, the digital signal converter circuit 36 converts the right and left channel analog audio signals $S_{RIN}$ and $S_{LIN}$, respectively, input to the digital audio tape recorder 1 into a digital audio signal $D_{AU}$.

The digital signal converter circuit 36, in the reproducing mode, converts the digital audio signal output $D_{AU}$ from the digital signal processing circuit 18 into right and left channel audio signals $S_{ROUT}$ and $S_{LOUT}$, respectively, and outputs the audio signals $S_{ROUT}$ and $S_{LOUT}$ from the digital audio tape recorder 1.

Thus, in the digital audio tape recorder 1, audio signals $S_{RIN}$ and $S_{LIN}$ and audio signals $S_{ROUT}$ and $S_{LOUT}$, which are all analog signals, are recorded and reproduced through the digital signal converter circuit 36.

(1-2-1) Digital signal processing circuit

The digital signal processing circuit 18 switches the operating mode in accordance with the control data $D_{CONT}$, and, on recording, it generates the record signal $S_{REC}$, while, on reproduction, it processes the reproduced signal $S_{RF}$.

Figure 1:
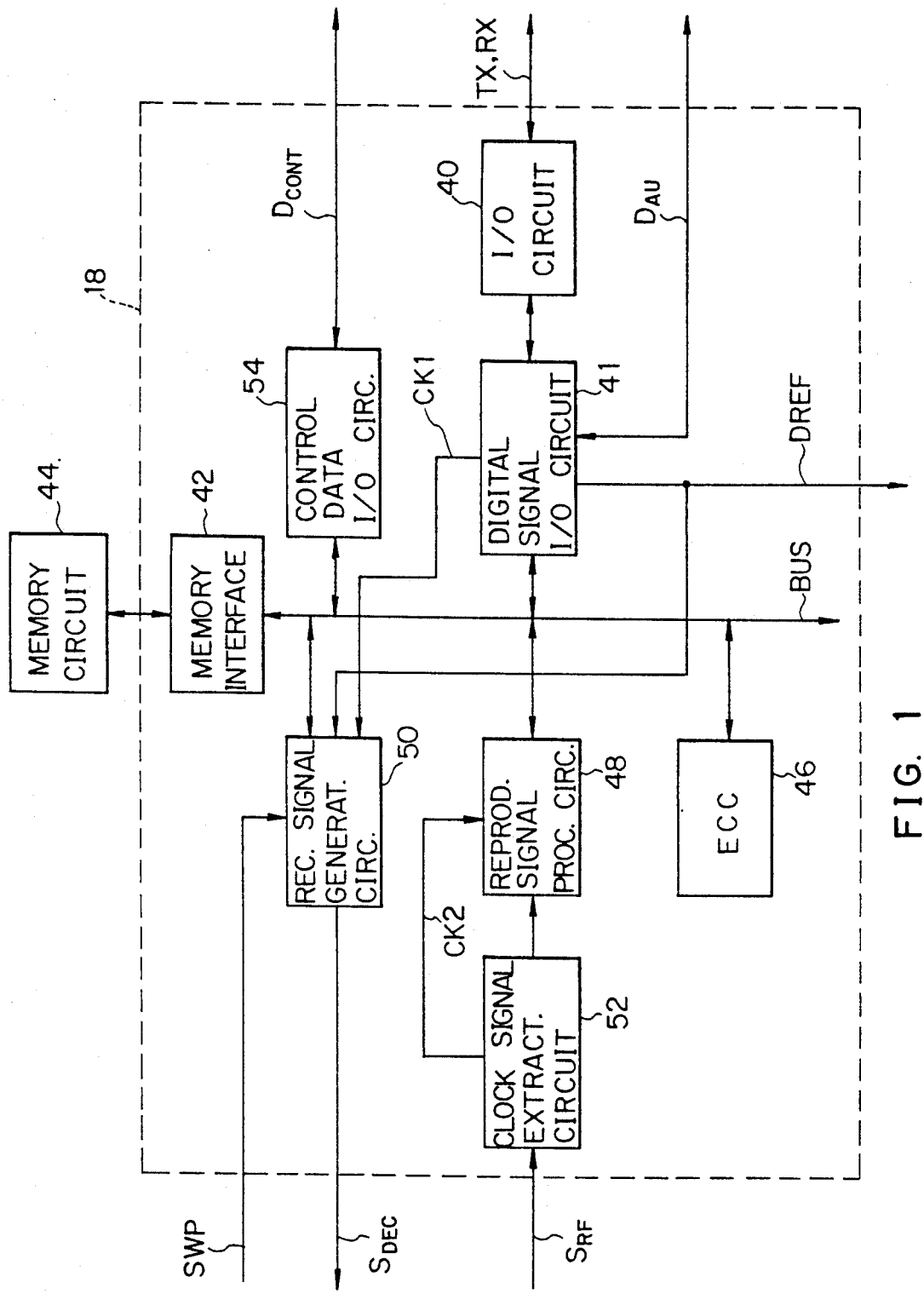
FIG. 1 is a block diagram showing a digital signal processing circuit according to an embodiment of the present invention.

More specifically, referring to FIG. 1 which shows the digital signal processing circuit 18 in more detail, an input/output circuit 40 converts a digital audio signal RX in the AES/EBU format input to the digital audio tape recorder 1 to a predetermined format and outputs the converted signal to the digital signal input/output circuit 41. The input/output circuit 41 receives or outputs the digital audio signal $D_{AU}$ directly from the digital signal converter circuit 36 when recording or reproducing, respectively.

The input/output circuit 40 further converts a digital audio signal output from the digital signal input/output circuit 41 to a digital audio signal TX in the AES/EBU format and outputs the signal.

Thus the digital audio tape recorder 1 is enabled to record and reproduce the digital audio signals TX and RX in the AES/EBU format in addition to audio signals $S_{RIN}$ and $S_{LIN}$ as well as $S_{ROUT}$ and $S_{LOUT}$, all thereof being analog signals The digital signal input/output circuit 41 loads the control data $D_{CONT}$ from a predetermined region in a memory circuit 44 through a BUS and a memory interface circuit 42 at a predetermined timing and switches the operating mode on the basis of the control data $D_{CONT}$.

More specifically, the digital signal input/output circuit 41, at the time of recording, selectively inputs the digital audio signal output from the input/output circuit 40 or the digital signal converter circuit 36 in accordance with the control data $D_{CONT}$, divides the digital audio signal into predetermined blocks, interleaves the blocks, and stores the blocked, intervealed signal in the memory circuit 44.

The block is set to a period of 60 msec in the LP mode of the normal mode, to a period of 30 msec in the SP mode of the normal mode and in the LP mode of the multiple-speed recording/reproducing mode, and to a period of 15 msec in the SP mode of the multiple-speed recording/reproducing mode.

The digital signal input/output circuit 41 has a reference signal generating circuit (not shown) and it generates a clock signal for sampling to be supplied to the digital signal converter circuit 36 and also generates a clock signal CK1 for record signal generation and the rotary drum reference signal $D_{REF}$.

At this time, the digital signal input/output circuit 41 switches the signal level of the rotary drum reference signal $D_{REF}$ so that one block of the digital audio signal stored in the memory circuit 44 may correspond to one period of the rotary drum reference signal $D_{REF}$.

Thus, in the digital signal processing circuit 18, by having the digital audio signal subjected to a block-wise interleave treatment and then having the signal stored in the memory circuit 44, one period of the rotary drum reference signal $D_{REF}$, agrees with the interleave period.

More specifically, the digital signal input/output circuit 41, by counting a predetermined clock signal using a counter circuit (not shown), sets the frequency of the rotary drum reference signal $D_{REF}$ to 50/3 Hz in the LP mode processing of the normal mode of the types A to D (FIGS. 7(A), (B), FIGS. 9(A)–(C), FIGS. 11(A)–(C), FIGS. 13(A)–(C), FIGS. 14(A), (B), FIGS. 16(A)–(C), and FIGS. (A)–(C)) and sets the frequency of the rotary drum reference signal $D_{REF}$ to 100/3 Hz in the SP mode processing of the normal mode (FIGS. 8(A)–(D), FIGS. 12(A)–(E), FIGS. 15(A), (B), FIGS. 16(A)–(C), and FIGS. 19(A)–(D)).

Further, in the multiple-speed recording/reproducing mode of the LP mode and the after recording mode for subcode data in the types A, B, and D, and in the after recording mode of the SP mode in the types A, B, and D (FIGS. 8(A)–(D), FIGS. 12(A)–(E), and FIGS. 19(A)–(D)) it sets the frequency of the rotary drum reference signal $D_{REF}$ to 100/3 Hz and in the multiple-speed recording/reproducing mode and the after record mode in the type C (FIGS. 17(A)–(D)) it sets the frequency to 200/3 Hz.

At the time of reproduction, the digital signal input/output circuit 41 receives the digital audio signal stored in the memory circuit 44 in blocks and then successively outputs the signal in accordance with a predetermined clock signal to the input/output circuit 40 and the digital signal converter circuit 36.

An error detection and correction circuit (ECC) 46, like the digital signal input/output circuit 41, receives the control data $D_{CONT}$ stored in the memory circuit 44 at a predetermined timing and switches its operation in accordance with the control data $D_{CONT}$.

More specifically, at the time of recording, the error detection and correction circuit 46 accesses the memory circuit 44 at a predetermined timing and sequentially loads, through the digital signal input/output circuit 41, the digital audio signal stored in the memory circuit 44, in the order of the performed interleave treatment.

Thereupon, the error detection and correction circuit 46 generates an error correcting parity code completing a block (i.e., formed of an internal code and an external code) of data for the digital audio signal and then stores the parity code in the memory circuit 44.

At the time of reproduction, the error detection and correction circuit 46 sequentially receives reproduced data stored in the memory circuit 44 by the reproduced signal processing circuit 48, carries out the error detection and error correction of the reproduced data, and stores the data back in the memory circuit 44.

Thus, at the time of recording, the digital audio signal with the parity code added thereto is sequentially stored in the memory circuit 44 in blocks, whereas, at the time of reproduction, the digital audio signal furnished with error correction code is sequentially stored in the memory circuit in the units of the blocks.

(1-2-2) Record signal generating circuit

The record signal generating circuit 50, like the digital signal input/output circuit 41, receives the control data $D_{CONT}$ stored in the memory circuit 44 at a predetermined timing and switches its operation in accordance with the control data $D_{CONT}$.

More specifically, at the time of recording, the record signal generating circuit 50 sequentially reads the digital audio signal stored in the memory circuit 44 together with the parity code in a predetermined order and applies an 8-10 modulation to the signals.

The record signal generating circuit 50, further, converts the modulated signal to serial data and outputs it with a pilot signal for an ATF tracking control sync signal and others attached thereto.

Thus, through the record signal generating circuit 50, a record signal $S_{REC}$ which was first subjected to a block-wise interleave treatment and then provided with the parity code and the like can be obtained. By outputting the record signal $S_{REC}$ to the magnetic heads 33A and 33B through an amplifier circuit 38, the digital audio signal can be successively recorded on the magnetic tape 19.

At this time, the record signal generating circuit 50, in accordance with the control data $D_{CONT}$, switches the data transmission speed and the timing of the outputting of the record signal $S_{REC}$, and thereby, the digital audio signal is successively recorded in the format standardized for the digital audio tape recorder.

More specifically, the record signal generating circuit 50 generates the reference signal for generating the record signal by dividing the frequency of a clock signal CK1 and, at this time, the factor by which the frequency of the clock signal CK1 is divided is switched on the basis of the control data $D_{CONT}$.

The record signal generating circuit 50 further generates the record signal $S_{REC}$ in accordance with the rotary drum reference signal $D_{REF}$ and the switching pulse signal SWP, and at this time, it switches the outputting timing in accordance with the control data $D_{CONT}$.

In the reproducing mode, the record signal generating circuit 50 stops outputting of the record signal $S_{REC}$ in accordance with the control data $D_{CONT}$.

(1-2-3) Modes in the type A

Figure 20:
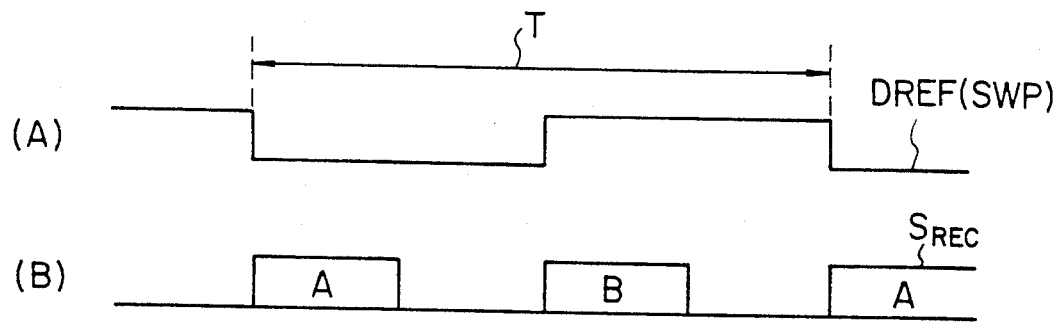

In the type A, as shown in FIGS. 20(A), (B), the record signal $S_{REC}$ (FIG. 20(B)) for one block unit is output in one period of the rotary drum reference signal $D_{REF}$ (FIG. 20(A)) such that the record signal $S_{REF}$ is output for ¼ period of the rotary drum reference signal $D_{REF}$ after the signal level of the rotary drum reference signal $D_{REF}$ changes.

At this time, the record signal generating circuit 50, in the LP mode recording, sets the transmission speed to 4.704 Mbps in accordance with the reference signal, whereas in the SP mode recording and in the multiple-speed recording/reproducing mode, it sets the transmission speed to 9.408 Mbps.

Thus, in the LP mode recording of the type A, the record signal generating circuit 50 is able to supply the magnetic heads 33A and 33B with a record signal $S_{REC}$ having a transmission speed of 4.704 Mbps (FIG. 7(B)) for the period of 15 msec each during which the magnetic heads 33A and 33B scan the magnetic tape 19 at intervals of one interleave period T (T=60 msec) whereby the audio signal can be recorded in a standardized format for the digital audio tape recorder.

In the SP mode recording of the type A, the record signal generating circuit 50 is able to supply the magnetic heads 33A and 33B with a record signal $S_{REC}$ having a transmission speed of 9.408 Mbps (FIG. 8(B)) for the period of 7.5 msec each while the magnetic heads 33A and 33B scan the magnetic tape 19 at intervals of one interleave period T (T=30 msec) whereby the audio signal can be recorded in the standardized format for the digital audio tape recorder 1.

Further, in the recording of the multiple-speed recording/reproducing mode, it is made possible to supply a record signal $S_{REC}$ having a transmission speed of 9.408 Mbps (FIG. 8(B)) which is double that in the LP mode recording (which therefore is generated at the same timing as that in the SP mode recording) for the period of 7.5 msec during which the magnetic heads 33A and 33B scan the magnetic tape 19 at intervals of one interleave period T (T=30 msec). Thus it is made possible to reproduce a magnetic tape recorded in the LP mode and record the signal in the multiple-speed mode.

(1-2-4) Modes in the type B

Figure 21:
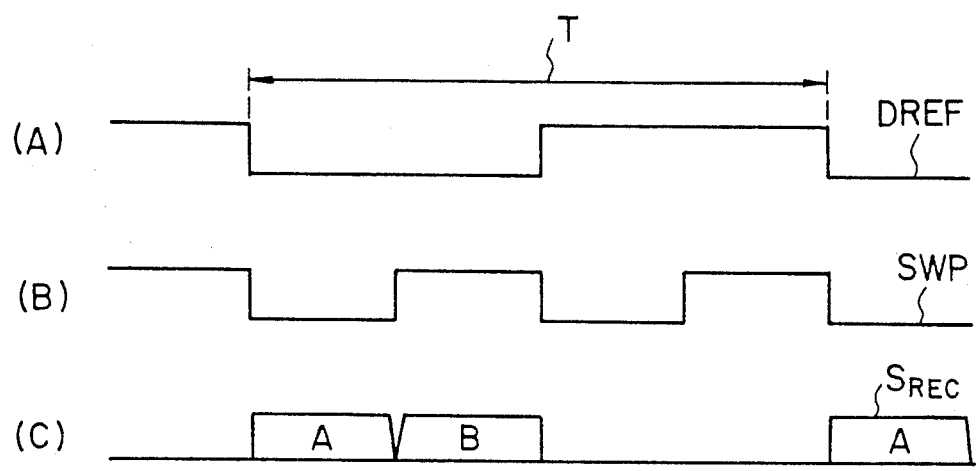

In the case of the type B as shown in FIGS. 21(A)-(C), the record signal $S_{REC}$ (FIG. 21(C)) is supplied to the A head 33A for the period beginning with the simultaneous fall times of the rotary drum reference signal $D_{REF}$ (FIG. 21(A)) and the switching pulse signal SWP (FIG. 21(B)) and ending with the timing of the rise of the switching pulse signal SWP. The record signal $S_{REC}$ is supplied to the head 33B for the period following the above period until the switching pulse signal SWP again falls.

At this time, the record signal generating circuit 50, in the LP mode recording, sets the transmission speed to 4.704 Mbps whereas it, in the SP mode recording and in the multiple-speed recording/reproducing mode, sets the transmission speed to 9.408 Mbps.

Thereby, in the LP mode recording of the type B, it is made possible to supply a record signal $S_{REC}$ with a transmission speed of 4.704 Mbps (FIG. 11(C)) to the magnetic heads 33A and 33B for the first of two periods of changes made by the switching pulse signal SWP (FIG. 11(B)) at intervals of one interleave period T (T=60 msec) (FIG. 11(A)). Thus, the audio signal can be recorded in the format standardized for the digital audio tape recorder the same as with the type A.

In the SP mode recording of the type B (in this case, one interleave period T=30 msec as shown in (FIG. 12(A)), the same as in the LP mode recording, a record signal $S_{REC}$ of having a transmission speed of 9.408 Mbps (FIG. 12(C)) is supplied to the magnetic heads 33A and 33B in the first period of the switching pulse signal SWP (FIG. 12(B)) and thus, the same as with the type A, the audio signal can be recorded in the format standardized for the digital audio tape recorder.

Further, in the recording of the multiple-speed recording/reproducing mode, the record signal is output at the same timing as in the SP mode recording as was the case with the type A (FIG. 12(C)), and thus, it is made possible to reproduce a magnetic tape recorded in the LP mode and record the signal in the multiple-speed mode.

(1-2-5) Modes in the type C and type D

Figure 22:
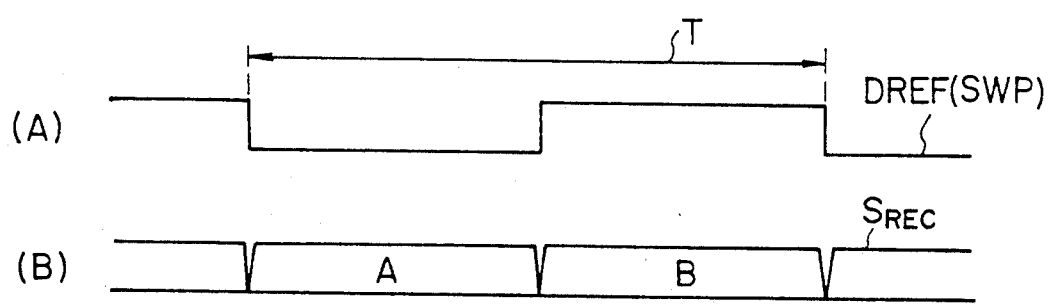

In the type C and the type D, as shown in FIG. 22(B), the record signal $S_{REC}$ is output continuously and is supplied to the magnetic heads 33A and 33B alternatively when the rotary drum reference signal $D_{REF}$ (FIG. 22(A)) reverses.

At this time, the record signal generating circuit 50, in the LP mode recording of the type C and the type D, sets the transmission speed to 2.453 Mbps whereas, in the SP mode recording of the type C and the type D and in the multiple-speed recording/reproducing mode of the type D, the record signal generating circuit 50 sets the transmission speed to 4.704 Mbps.

Figure 14:
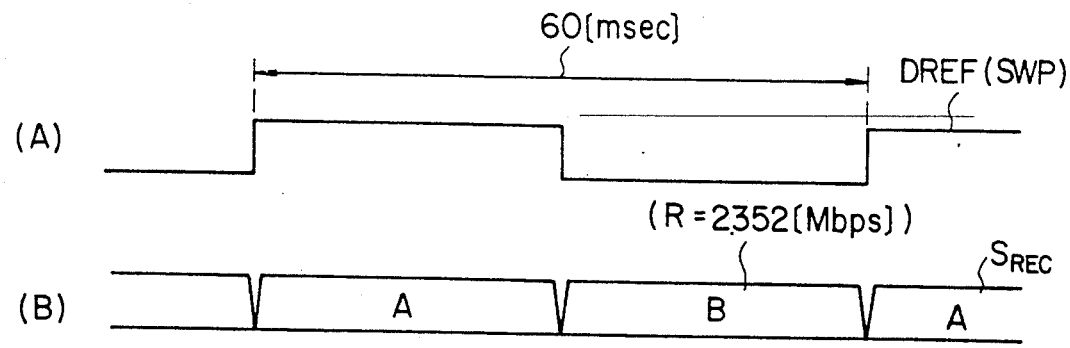
FIGS. 14(A) and 14(B) are signal wave form charts showing the operation of the type C head arrangement during the LP mode recording of the normal mode, with FIG. 14(A) showing both the rotary drum reference signal ($D_{REF}$) and the switching pulse signal (SWP) and FIG. 14(B) showing the record signal ($S_{REC}$)

Thereby, in the LP mode recording of the type C and the type D, it is possible to continuously supply the record signal $S_{REC}$ with a transmission speed of 2.453 Mbps (FIG. 14(B)) to the magnetic heads 33A and 33B, and thus, as was the case with the type A, the audio signal can be recorded in the format standardized for the digital audio tape recorder.

Figure 15:
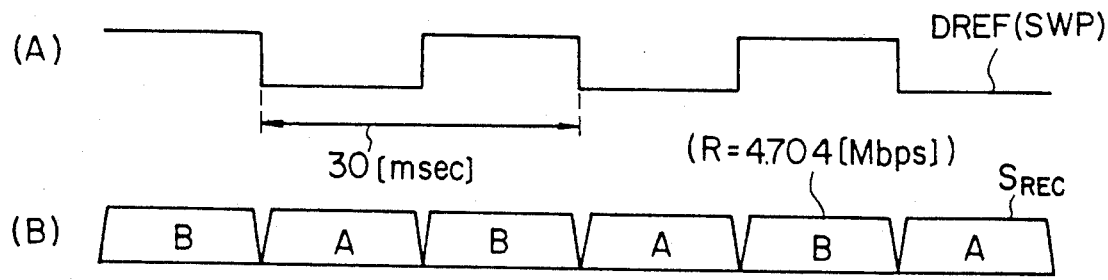
FIGS. 15(A) and 15(B) are signal wave form charts showing the operation of the type C head arrangement during the SP mode recording of the normal mode, with FIG. 15(A) showing both the rotary drum reference signal ($D_{REF}$) and the switching pulse signal (SWP) and FIG. 15(B) showing the record signal ($S_{REC}$)

In the SP mode recording of the type C and the type D, (in this case, one interleave period T=30 msec as shown in (FIG. 15(A)) a record signal $S_{REC}$ with a transmission speed of 4.704 Mbps (FIG. 15(B)) can be supplied to the magnetic heads 33A and 33B, and thus, as was the case with the type A, the audio signal can be recorded in the format standardized for the digital audio tape recorder.

Further, the record signal generating circuit 50, in the multiple-speed recording/reproducing mode of the type C, sets the transmission speed to 9.408 Mbps whereas, it, in the multiple-speed recording/reproducing mode of the type D, sets the transmission speed to 4.704 Mbps.

Thus, in the multiple-speed recording/reproducing mode of the type C, it is made possible to reproduce magnetic tapes recorded in the LP mode and the SP mode and record the obtained signal in the multiple-speed mode at a transmission speed of 9.408 Mbps (FIG. 17(C)).

Likewise, in the multiple-speed recording/reproducing mode of the type D, it is made possible to reproduce a magnetic tape recorded in the LP mode and record the obtained signal in the multiple-speed mode at a transmission speed of 4.704 Mbps (FIG. 19(C)).

Thus, in the present embodiment, the functional information of the digital audio tape recorder 1, such as the diameter of the rotary drum 26, the arrangement of the magnetic heads 33A and 33B on the rotary drum 26, and the wrap angle of the magnetic tape 19 is stored in the memory circuit 44 together with the operating mode information as the control data $D_{CONT}$. The timing of the outputting and the transmission speed of the record signal $S_{REC}$ is switched in accordance with the control data $D_{CONT}$, and, therefore, it is made possible, even if the rotating drum or the like is changed, to supply the record signal $S_{REC}$ in response to the change. Thus, the digital signal processing circuit can be used in common in the arrangements in which the rotating drum or the like is changed.

(1-2-6) Processing of the reproduced signal

Referring again to FIG. 1, the clock signal extracting circuit 52, in the reproducing mode, receives the reproduced signal $S_{RF}$ output from the magnetic heads 33A and 33B and extracts the reproduction clock signal CK2 from the reproduced signal $S_{RF}$ and supplies it to the reproduced signal processing circuit 48.

The reproduced signal processing circuit 48, in accordance with the control data $D_{CONT}$, stops its operation at the time of recording, and it, in accordance with the reproduction clock signal CK2, applies a 10-8 demodulation to the reproduced signal $S_{RF}$ at the time of reproduction and stores the thus obtained reproduced data sequentially in predetermined regions of the memory circuit 44.

More specifically, in the LP mode reproduction of the type A (FIGS. 9(A)-(C)) the reproduced signal $S_{RF}$ (FIG. 9(C)) for one interleave period, or for two periods of the switching pulse signal SWP (FIG. 9(B)) is output at a transmission speed of 9.408 Mbps 2 times over. Therefore, the reproduced data is demodulated by using a method disclosed in Japanese Laid-open Patent Publication No. 63-205861 (which method will hereinafter be referred to as "NT demodulation".

In the SP mode reproduction and the reproduction in the multiple-speed recording/reproducing mode (FIGS. 8(A)-(D)), a reproduced signal $S_{RF}$ with the same transmission speed 9.408 Mbps as the record signal $S_{REC}$ is obtained (FIG. 8(C)) and the reproduced data is demodulated by processing the reproduced signal $S_{RF}$ in accordance with the reproducing clock signal CK2 (which method will hereinafter be deferred to as "ATF demodulation" as against the NT demodulation).

Figure 13:
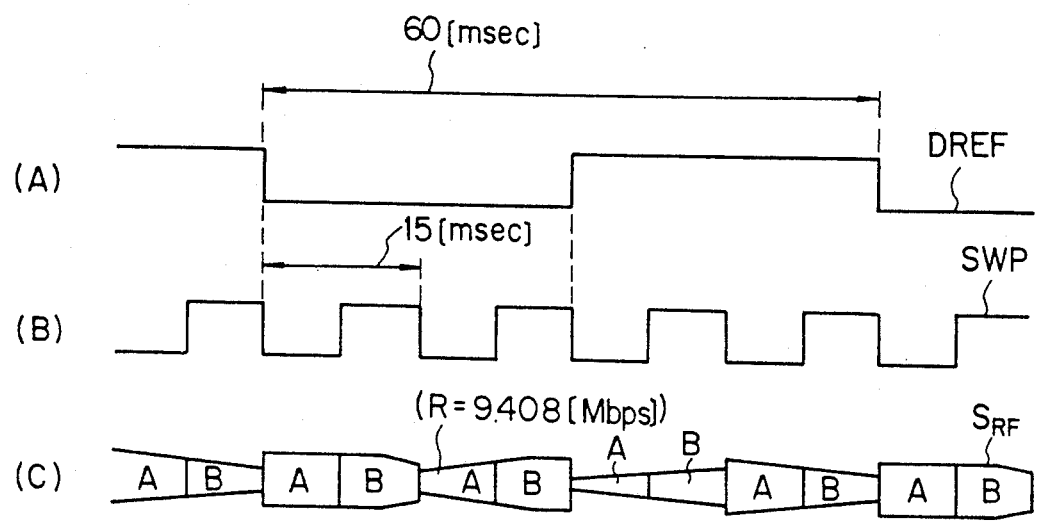
FIGS. 13(A) to 13(C) are signal wave form charts showing the operation of the type B head arrangement during the reproduction of a tape recorded in the LP mode of the normal mode, with FIG. 13(A) showing the rotary drum reference signal ($D_{REF}$), FIG. 13(B) showing the switching pulse signal (SWP) and FIG. 13(C) showing the reproduced signal ($S_{RF}$)

Likewise, in the LP mode demodulation of the type B (FIGS. 13(A)-(C)) a reproduced signal $S_{RF}$ with a transmission speed of 4.704 Mbps (FIG. 13(C)) can be obtained in accordance with the rotary drum reference signal $D_{REF}$ (FIG. 13(A)) and the switching pulse signal SWP (FIG. 13(B)) whereas in the SP mode reproduction of the type B and in the reproduction of the multiple-speed recording/reproducing mode of the type B (FIGS. 12(A)-(E)) a reproduced signal $S_{RF}$ with a transmission speed of 9.048 Mbps (FIG. 12(D)) can be obtained, and the reproduced data are output through the NT demodulation and the ATF demodulation, respectively.

In the type C and the type D, reproduced signals $S_{RF}$ with transmission speeds of 9.408 Mbps and 4.704 Mbps (FIG. 16(C), FIG. 17(D), FIG. 18(C) and FIG. 19(C)) are respectively obtained and the reproduced data are output through the NT demodulation or the ATF demodulation.

The thus demodulated reproduced data are once stored in the memory circuit 44, then corrected for errors in the error detection and correction circuit 46, and sequentially output through the digital signal input/output circuit 41. The digital audio signal recorded in the magnetic tape 19 can thus be reproduced.

The record signals denoted by characters $S_{RECAF}$ (FIG. 8(D), FIG. 12(E), FIG. 17(D) and FIG. 19(D)) represent the record signals of subcodes in the after recording modes. Further, the reproduced signal processing circuit 48 extracts the data of the subcode from the reproduced data and stores the data as data for the status byte of the control data $D_{CONT}$ in the memory circuit 44.

The control data input/output circuit 54 stores the control data $D_{CONT}$ output from the system control circuit 6 into a predetermined region of the memory circuit 44.

Further, the control data input/output circuit 54, at the time of reproduction, reads out the data of the status byte from the memory circuit 44 and outputs it to the system control circuit 6.

Thus, at the time of recording, the control data $D_{CONT}$, including the mode byte and the status byte is output from the system control circuit 6. The digital signal processing circuit 18 switches its operation in accordance with the data of the mode byte and the status byte and thereby, recording of the audio signal in a predetermined record format is achieved.

At the time of reproduction, the data of the status byte output from the reproduced signal processing circuit 48 is stored in the memory circuit 44 together with the data of the mode byte output from the system control circuit 6. In this way, reproduction of the magnetic tape 19 is achieved in accordance with the structural information output from the system control circuit 6 and the record format which can be detected from the reproduced signal $S_{RF}$.

(2) Operation of the embodiment

In the above described arrangement, the digital signal input/output circuit 41, reproduced signal processing circuit 48, record signal generating circuit 50, and the error detection and correction circuit 46 receive the control data $D_{CONT}$ stored in the memory circuit 44 at a predetermined timing, and switch their operating modes in accordance with the control data $D_{CONT}$.

More specifically, in the recording mode, the digital audio signal $D_{AU}$ input through the audio signal converter circuit 36 (FIG. 2) is subjected to an interleave treatment in the digital signal input/output circuit 41 and divided into units of blocks and is stored in the memory circuit 44.

The digital audio signal $D_{AU}$ stored in the memory circuit 44 is provided with a parity code in the error detection and correction circuit 46, and thereafter, converted to the record signal $S_{REC}$ in the record signal generating circuit 50.

At this time, the record signal $S_{REC}$ is successively output to the magnetic heads 33A and 33B at a predetermined timing corresponding to the diameter of the rotary drum or the like in accordance with the control data $D_{CONT}$, and thereby, the digital signal is successively recorded on the magnetic tape 19 in a predetermined record format.

At the time of reproduction, the record signal generating circuit 50 stops its operation in accordance with the control data $D_{CONT}$ and the reproduced signal processing circuit 48 performs its operation.

The error detection and correction circuit 46 and the digital signal input/output circuit 41 switch their operations and process the reproduced signal $S_{RF}$.

More specifically, after the clock signal CK2 is extracted from the reproduced signal $S_{RF}$ in the clock signal extracting circuit 52, it is demodulated in the reproduced signal processing circuit 48.

The thus demodulated reproduced data is once stored in the memory circuit 44, then subjected to the error detection and correction treatment in the error detection and correction circuit 46 and stored back in the memory circuit 44, and thereafter, successively output through the digital signal input/output circuit 41.

At this time, the reproduced signal processing circuit 48 processes the reproduced signal $S_{RF}$ in accordance with the control data $D_{CONT}$. Thus, a digital signal processing circuit 18 which can be used in common to systems having different arrangement of the rotary drum or the like can be provided.

(3) Effects of the embodiment

According to the above described arrangement, by having the structural information of the digital audio tape recorder 1 stored in the memory circuit 44 together with the operating mode information or the like as the control data $D_{CONT}$, and by switching the timing of outputting of the record signal and the transmission speed in accordance with the control data $D_{CONT}$, the digital signal processing circuit 18 can be used in common to different arrangements in which the rotary drum or the like is changed.

(4) Other embodiments

Although, in the above embodiments, the cases were described where the present invention was applied to a digital audio tape recorder having a rotary drum with different diameters of 30 mm or 15 mm, the present invention is not limited to such an arrangement but the above described teachings can be widely applied to a digital audio tape recorder having a rotary drum whose diameter is, for example, 20 mm or 10 mm.

Although, in the above embodiments, the cases were described where the rotary drum and the magnetic tape were driven in the conditions described in FIG. 6, the present invention is not limited to such cases but can be widely applied to the cases where they are driven in various other conditions.

Although, in the above embodiments the case where the control data was stored in the memory circuit 44 was described, the present invention is not limited to such an arrangement but can be widely applied to such cases where the memory circuit for storing the control data is provided separately or only the structural data is set for example, by switches or similar means.

Although, in the above embodiments, the cases where audio signals were recorded and reproduced were described, the present invention is not limited to such signal processing but can be applied to a digital audio tape recorder which is dedicated for reproduction or dedicated for recording, or a magnetic recording apparatus for recording and reproducing various data other than audio signals.

Although the present invention has been shown and described with respect to preferred embodiments, various changes and modifications which are obvious to a person skilled in the art to which the invention pertains are deemed to lie within the spirit and scope of the invention as claimed.

What is claimed is:

1. In a digital signal recording apparatus of the type which converts a digital signal to a record signal, and then provides the record signal at a predetermined timing and transmission speed to magnetic heads mounted in a known arrangement on a rotary drum of a known diameter to record the digital signal on a magnetic tape wrapped around the rotary drum at a known wrap angle, a digital circuit for processing the record signal, the circuit comprising:

memory means for storing control data representative of the diameter of the rotary drum, the wrap angle of the magnetic tape around the rotary drum, and the arrangement of the magnetic heads on the rotary drum; and means connected to the memory means and responsive to the control data stored in the memory means for switching the transmission speed and timing of the record signal in response to the control data.

2. A digital record/reproduce signal processing circuit for use in a digital audio tape recorder/reproducer that records a digital input signal on a magnetic tape, and reproduces a digital output signal from a recorded magnetic tape, the recorder/reproducer including a rotary drum of a known diameter around which the tape is wrapped at a known wrap angle, and a pair of magnetic heads mounted on the rotary drum with a known angular spacing, the digital record/reproduce signal processing circuit comprising:

(a) a digital memory means for storing data, including control data $D_{CONT}$ representing the diameter of the rotary drum, the wrap angle of the magnetic tape, and the angular spacing of the magnetic heads;

(b) a digital signal input/output circuit means, connected to the digital memory means and supplied with the control data $D_{CONT}$, for
      (1) during recording,
         (i) receiving the digital input signal,
         (ii) dividing the digital input signal into blocks of recording data, and
         (iii) storing the blocks of recording data in the digital memory means, and,
      (2) during reproduction of a recorded magnetic tape,
         (i) receiving reproduced digital data from the digital memory means, and
         (ii) providing the digital output signal from the blocks of reproduced digital data;

(c) a record signal generating circuit means, connected to the digital memory means and supplied with the control data $D_{CONT}$, for, during recording,
      (1) receiving the blocks of recording data from the digital memory means,
      (2) modulating the blocks of recording data, and
      (3) providing the modulated blocks of recording data as a record signal $S_{REC}$ at a timing determined by the control data $D_{CONT}$, whereby the digital input signal is recorded on the magnetic tape in a predetermined record format.

3. A digital record/reproduce signal processing circuit, as recited in claim 2, wherein the control data $D_{CONT}$ additionally includes a status byte, a recorded magnetic tape includes subcode data, the subcode data including the status byte portion of the control data $D_{CONT}$, during reproduction of a recorded magnetic tape, the magnetic heads generate a reproduced signal $S_{RF}$, and the circuit further comprises:

a reproduced signal processing circuit means, connected to the digital memory means and supplied with the control data $D_{CONT}$, for receiving and demodulating the reproduced signal $S_{RF}$ in response to the control data $D_{CONT}$, extracting the status byte from subcode data in the reproduced signal $S_{RF}$, and storing the status byte in the digital memory means as part of the control data $D_{CONT}$.

4. A digital record/reproduce signal processing circuit, as recited in claim 2, wherein the circuit further comprises an operator controllable means for changing the control data $D_{CONT}$ stored in the digital memory means, and the timing and the transmission speed of the record signal $S_{REC}$ is switched in response to the control data $D_{CONT}$, whereby if the rotating drum, the wrap angle, or the angular spacing of the magnetic heads is changed, the record signal $S_{REC}$ can be made appropriate for the changed rotating drum, wrap angle, or angular spacing of the heads by changing the control data $D_{CONT}$, which enables the digital record/reproduce signal processing circuit to be used in digital audio tape recorder/reproducers having different rotating drum diameters, wrap angles, or angular spacing of the magnetic heads.

5. A digital record/reproduce signal processing circuit, as recited in claim 2, wherein the control data $D_{CONT}$ includes data representing the operational mode of the digital audio tape recorder/reproducer.

6. A method for recording a digital signal on a magnetic tape, the method comprising:

providing a tape recorder having a known arrangement of magnetic heads on a rotary drum having a known diameter, the magnetic tape being wrapped around the rotary drum at a known wrap angle;

providing information on the diameter of the rotary drum, information on the wrap angle of the magnetic tape wrapped around the rotary drum, and information on the arrangement of the magnetic heads on the rotary drum;

converting the digital signal to a record signal; and providing the record signal to the magnetic heads at a transmission speed and at a timing switched in response to the information on the diameter of the rotary drum, information on the wrap angle of the magnetic tape wrapped around the rotary drum, and information on the arrangement of the magnetic heads on the rotary drum.

7. The method of claim 6, wherein the step of providing the record signal to the magnetic heads includes reading from a digital memory the information on the diameter of the rotary drum, the information on the wrap angle of the magnetic tape wound around the rotary drum, and the information on the arrangement of the magnetic heads on the rotary drum.

8. The method of claim 6, wherein the step of providing the record signal to the magnetic heads includes:

reproducing subcode data recorded on the magnetic tape; and extracting from the subcode data the information on the diameter of the rotary drum, the information on the wrap angle of the magnetic tape wound around the rotary drum, and the information on the arrangement of the magnetic heads on the rotary drum.

9. A digital information signal processing circuit for use in a plurality of types of digital audio tape recorder, all of the types of recorder recording a digital input signal on a magnetic tape in a standard track format and including a rotary drum around which the magnetic tape is wrapped at a wrap angle, and a pair of magnetic heads mounted on the rotary drum with an angular spacing between them, the types of recorder differing in the diameter of the rotating drum, the wrap angle, and the angular spacing of the magnetic heads, the digital information signal processing circuit comprising:

memory means for storing data, including control data $D_{CONT}$ representing the diameter of the rotary drum, the wrap angle of the magnetic tape, and the angular spacing of the magnetic heads of the type of digital audio tape recorder in which the digital information signal processing circuit is used;

means for converting the digital input signal into a record signal;

means for providing the record signal to the magnetic heads, the record signal having a transmission speed and a timing;

means for switching the transmission speed and timing of the record signal in response to the control data $D_{CONT}$, whereby the digital input signal is recorded on the magnetic tape in the standard track format, irrespective of the diameter of the rotating drum, the wrap angle, and the angular spacing of the magnetic heads of the type of digital audio tape recorder in which the digital information signal processing circuit is used.

10. The digital information signal processing circuit of claim 9, wherein the control data $D_{CONT}$ additionally includes a status byte, the status byte representing parameters relating to the recording, and the circuit additionally comprises means for adding the status byte to the record signal as subcode data.

11. The digital information signal processing circuit of claim 9, wherein the circuit is additionally for use in a plurality of types of digital audio tape recorder/reproducer, all of the types of recorder/reproducer additionally reproducing a digital output signal from a magnetic tape recorded in the standard track format, the digital information signal processing circuit comprising:

means for deriving a reproduce signal from the magnetic heads, and means, responsive to the control data $D_{CONT}$, for deriving the digital output signal from the reproduce signal.

12. The digital information signal processing circuit of claim 11, wherein the control data $D_{CONT}$ includes a status byte, the status byte representing parameters relating to the recording, and the circuit additionally comprises means for adding the status byte to the record signal as subcode data.

13. The digital information signal processing circuit of claim 12, wherein the means for deriving the digital output signal from the reproduce signal includes:

means, connected to the memory means and receiving the control data $D_{CONT}$, for receiving and demodulating the reproduced signal in response to the control data $D_{CONT}$;

means for extracting the status byte from the subcode data in the demodulated reproduced signal; and means for storing the status byte in the memory means as part of the control data $D_{CONT}$.

14. A digital information signal processing circuit for use in a plurality of types of digital audio tape reproducer, all of the types of reproducer reproducing a digital output signal from a magnetic tape recorded in a standard track format and including a rotary drum around which the magnetic tape is wrapped at a wrap angle, and a pair of magnetic heads mounted on the rotary drum with an angular diameter of the rotating drum, the wrap angle, and the angular spacing of the magnetic heads, the digital information signal processing circuit comprising:

memory means for storing data, including control data $D_{CONT}$ representing the diameter of the rotary drum, the wrap angle of the magnetic tape, and the angular spacing of the magnetic heads of the type of digital audio tape recorder in which the digital information signal processing circuit is used;

means for deriving a reproduce signal from the magnetic heads; and means, responsive to the control data $D_{CONT}$, for deriving the digital output signal from the reproduce signal by switching the timing of the reproduce signal, whereby the tape information is reproduced irrespective of the diameter of the rotating drum, the wrap angle, and the angular spacing of the magnetic heads of the type of digital audio type recorder in which the digital information signal processing circuit is used.

15. The digital information signal processing circuit of claim 14, wherein the means for deriving the digital output signal from the reproduce signal includes:

means, connected to the memory means and receiving the control data $D_{CONT}$, for receiving and demodulating the reproduced signal in response to the control data $D_{CONT}$;

means for extracting a status byte from subcode data in the demodulated reproduced signal; and means for storing the status byte in the memory means as part of the control data $D_{CONT}$.

* * * * *